US010593962B2

(12) United States Patent
Herchen et al.

(10) Patent No.: US 10,593,962 B2
(45) Date of Patent: Mar. 17, 2020

(54) PRE-FORMED POWDER DELIVERY TO POWDER PRESS MACHINE

(71) Applicant: BLOOM ENERGY CORPORATION, Sunnyvale, CA (US)

(72) Inventors: Harald Herchen, Los Altos, CA (US); Matthias Gottmann, Sunnyvale, CA (US); Ian Russell, Sunnyvale, CA (US); Jonathan Cerrona, Fremont, CA (US); Cheng-yu Lin, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 502 days.

(21) Appl. No.: 15/294,372

(22) Filed: Oct. 14, 2016

(65) Prior Publication Data

US 2017/0054157 A1 Feb. 23, 2017

Related U.S. Application Data

(62) Division of application No. 14/501,572, filed on Sep. 30, 2014, now Pat. No. 9,502,721.
(Continued)

(51) Int. Cl.
*B22F 3/093* (2006.01)
*B22F 3/03* (2006.01)
(Continued)

(52) U.S. Cl.
CPC ............. *H01M 8/0208* (2013.01); *B22F 3/03* (2013.01); *B22F 3/093* (2013.01); *B22F 5/00* (2013.01);
(Continued)

(58) Field of Classification Search
CPC .............. B22F 2202/01; B30B 11/022; B30B 15/0076; B29C 2043/3266; B29C 67/244; B29C 2791/008
See application file for complete search history.

(56) References Cited

U.S. PATENT DOCUMENTS 4,135,041 A 1/1979 Jung et al.
4,292,379 A 9/1981 Kothmann
(Continued)

FOREIGN PATENT DOCUMENTS

EP 0615299 A1 9/1994
EP 1098380 A1 9/2001
(Continued)

OTHER PUBLICATIONS

Martin Bauer, F. Ritter, Georg Siegmund, "High-precision laser vibrometers based on digital Doppler signal processing," Proc. SPIE 4827, Fifth International Conference on Vibration Measurements by Laser Techniques: Advances and Applications, May 22, 2002, pp. 50-61. (Year: 2002).*
(Continued)

*Primary Examiner* — Vanessa T. Luk
(74) *Attorney, Agent, or Firm* — The Marbury Law Group PLLC

(57) ABSTRACT

Methods for fabricating an interconnect for a fuel cell system that include forming a metal powder into a preform structure, positioning the preform structure in a die cavity of a press apparatus, and compressing the preform structure in the press apparatus to form the interconnect. Further embodiments include use of thin inserts in the die cavity to provide reduced permeability and/or including filler material in the die cavity.

8 Claims, 15 Drawing Sheets

Related U.S. Application Data

(60) Provisional application No. 61/885,048, filed on Oct. 1, 2013.

(51) Int. Cl.
| | |
|---|---|
| *B30B 11/02* | (2006.01) |
| *B22F 5/00* | (2006.01) |
| *H01M 8/0208* | (2016.01) |
| *H01M 8/0206* | (2016.01) |
| *B22F 7/08* | (2006.01) |
| *H01M 8/0232* | (2016.01) |
| *B30B 15/30* | (2006.01) |
| *B30B 15/00* | (2006.01) |
| *H01M 8/12* | (2016.01) |
| *H01M 8/124* | (2016.01) |
| *H01M 8/0228* | (2016.01) |
| *H01M 8/021* | (2016.01) |

(52) U.S. Cl.
CPC ............... *B22F 7/08* (2013.01); *B30B 11/02* (2013.01); *B30B 11/022* (2013.01); *B30B 15/00* (2013.01); *B30B 15/30* (2013.01); *B30B 15/308* (2013.01); *H01M 8/0206* (2013.01); *H01M 8/0232* (2013.01); *H01M 8/12* (2013.01); *B22F 2998/10* (2013.01); *B22F 2999/00* (2013.01); *H01M 8/021* (2013.01); *H01M 8/0228* (2013.01); *H01M 2008/1293* (2013.01); *H01M 2300/0074* (2013.01); *Y02E 60/525* (2013.01)

(56) References Cited

U.S. PATENT DOCUMENTS

| | | | |
|---|---|---|---|
| 4,755,429 A | 7/1988 | Nickols et al. | |
| 4,913,982 A | 4/1990 | Kotchick et al. | |
| 4,971,755 A * | 11/1990 | Kawano | B22F 1/0014 419/10 |
| 5,162,167 A | 11/1992 | Minh et al. | |
| 5,213,910 A | 5/1993 | Yamada | |
| 5,215,946 A | 6/1993 | Minh | |
| 5,248,712 A | 9/1993 | Takeuchi et al. | |
| 5,256,499 A | 10/1993 | Minh et al. | |
| 5,273,837 A | 12/1993 | Aiken et al. | |
| 5,290,642 A | 3/1994 | Minh et al. | |
| 5,342,705 A | 8/1994 | Minh et al. | |
| 5,368,667 A | 11/1994 | Minh et al. | |
| 5,382,315 A | 1/1995 | Kumar | |
| 5,453,331 A | 9/1995 | Bloom et al. | |
| 5,460,897 A | 10/1995 | Gibson et al. | |
| 5,476,248 A | 12/1995 | Kobayashi et al. | |
| 5,494,700 A | 2/1996 | Anderson et al. | |
| 5,501,914 A | 3/1996 | Satake et al. | |
| 5,518,829 A | 5/1996 | Satake et al. | |
| 5,554,454 A | 9/1996 | Gardner et al. | |
| 5,589,017 A | 12/1996 | Minh | |
| 5,641,585 A | 6/1997 | Lessing et al. | |
| 5,733,499 A | 3/1998 | Takeuchi et al. | |
| 5,942,349 A | 8/1999 | Badwal et al. | |
| 5,955,392 A | 9/1999 | Takeuchi et al. | |
| 5,964,991 A | 10/1999 | Kawasaki et al. | |
| 5,981,098 A | 11/1999 | Vitale | |
| 6,001,761 A | 12/1999 | Hata et al. | |
| 6,183,897 B1 | 2/2001 | Hartvigsen et al. | |
| 6,280,868 B1 | 8/2001 | Badwal et al. | |
| 6,361,892 B1 | 3/2002 | Ruhl et al. | |
| 6,406,809 B1 | 6/2002 | Fujii et al. | |
| 6,444,340 B1 | 9/2002 | Jaffrey | |
| 6,492,053 B1 | 12/2002 | Donelson et al. | |
| 6,492,055 B1 | 12/2002 | Shimotori et al. | |
| 6,502,623 B1 | 1/2003 | Schmitt | |
| 6,503,653 B2 | 1/2003 | Rock | |
| 6,582,845 B2 | 6/2003 | Helfinstine et al. | |
| 6,589,681 B1 | 7/2003 | Yamanis | |
| 6,635,378 B1 | 10/2003 | Yang et al. | |
| 6,638,575 B1 | 10/2003 | Chen et al. | |
| 6,777,126 B1 | 8/2004 | Allen | |
| 6,835,488 B2 | 12/2004 | Sasahara et al. | |
| 6,890,677 B2 | 5/2005 | Klitsner et al. | |
| 7,045,237 B2 | 5/2006 | Sridhar et al. | |
| 7,150,934 B2 | 12/2006 | Yoshida et al. | |
| 7,255,139 B2 | 8/2007 | Tochio et al. | |
| 7,390,456 B2 | 6/2008 | Glatz et al. | |
| 8,110,319 B2 | 2/2012 | Nguyen et al. | |
| 8,173,063 B2 | 5/2012 | Zobl et al. | |
| 8,241,817 B2 | 8/2012 | Yang et al. | |
| 2001/0016174 A1* | 8/2001 | Tsuchida | B22F 1/02 419/38 |
| 2002/0012825 A1 | 1/2002 | Sasahara et al. | |
| 2002/0081478 A1 | 6/2002 | Busenbender | |
| 2002/0132156 A1 | 9/2002 | Ruhl et al. | |
| 2003/0022053 A1 | 1/2003 | Anderson et al. | |
| 2003/0041748 A1* | 3/2003 | Hinzpeter | B22F 3/03 100/214 |
| 2003/0082434 A1 | 5/2003 | Wang et al. | |
| 2003/0157387 A1 | 8/2003 | Hase et al. | |
| 2003/0170082 A1 | 9/2003 | Garcia et al. | |
| 2003/0170527 A1 | 9/2003 | Finn et al. | |
| 2003/0180602 A1 | 9/2003 | Finn | |
| 2004/0101742 A1 | 5/2004 | Simpkins et al. | |
| 2004/0200187 A1 | 10/2004 | Warrier et al. | |
| 2004/0241033 A1* | 12/2004 | Ogawa | B22F 3/02 419/66 |
| 2005/0017055 A1 | 1/2005 | Kurz et al. | |
| 2005/0019646 A1 | 1/2005 | Joos | |
| 2005/0084725 A1 | 4/2005 | Arthur et al. | |
| 2005/0136312 A1 | 6/2005 | Bourgeois et al. | |
| 2005/0227134 A1 | 10/2005 | Nguyen | |
| 2005/0255364 A1 | 11/2005 | Cho et al. | |
| 2006/0192323 A1 | 8/2006 | Zobl et al. | |
| 2006/0204826 A1 | 9/2006 | Borchers | |
| 2006/0204827 A1 | 9/2006 | Hickey et al. | |
| 2007/0134532 A1 | 6/2007 | Jacobson et al. | |
| 2007/0151415 A1 | 7/2007 | Chun et al. | |
| 2007/0196704 A1 | 8/2007 | Valensa et al. | |
| 2007/0207375 A1 | 9/2007 | Jaconbson et al. | |
| 2007/0231676 A1 | 10/2007 | Cassidy et al. | |
| 2008/0081223 A1 | 4/2008 | Yasumoto et al. | |
| 2008/0199738 A1 | 8/2008 | Perry et al. | |
| 2009/0004547 A1 | 1/2009 | Vitella et al. | |
| 2009/0117441 A1 | 5/2009 | Suzuki et al. | |
| 2009/0162236 A1 | 6/2009 | Hammond et al. | |
| 2009/0220833 A1 | 9/2009 | Jones | |
| 2009/0246636 A1 | 10/2009 | Chiang et al. | |
| 2010/0119917 A1 | 5/2010 | Kumar et al. | |
| 2010/0233576 A1 | 9/2010 | Brandner et al. | |
| 2010/0239937 A1 | 9/2010 | Janousek et al. | |
| 2011/0135531 A1 | 6/2011 | Hsu et al. | |
| 2011/0143261 A1 | 6/2011 | Brandner et al. | |
| 2011/0223510 A1 | 9/2011 | Horst | |
| 2011/0287340 A1 | 11/2011 | Mougin et al. | |
| 2013/0129557 A1 | 5/2013 | Herchen et al. | |

FOREIGN PATENT DOCUMENTS

| | | |
|---|---|---|
| JP | 61-148766 | 7/1986 |
| JP | H 03-140401 A | 6/1991 |
| JP | 06-215778 | 8/1994 |
| JP | H 08-176615 A | 7/1996 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2005-216732 A | 8/2005 |
| JP | 2010-113955 | 5/2010 |
| JP | 2010-153311 A | 7/2010 |
| WO | WO2003/007413 A1 | 1/2003 |
| WO | WO2003/071618 A2 | 8/2003 |

(56) References Cited

FOREIGN PATENT DOCUMENTS

| WO | WO2006/016628 A1 | 2/2006 | |
|---|---|---|---|
| WO | WO-2013057136 A2 * | 4/2013 | ............. B01F 11/02 |
| WO | WO2013/130515 A1 | 9/2013 | |

OTHER PUBLICATIONS

Haynes International High-Temperature Alloys, "HAYNES (Reg.) 214 (TM) alloy", 1996, pp. 1-19.

Haynes International High-Temperature Alloys, "HAYNES (Reg.) 230(TM) alloy", 2004, pp. 1-27.

International Search Report & Written Opinion, International Application No. PCT/US2007/08224, dated Nov. 26, 2008, 10 pgs.

International Search Report, International Application No. PCT/US2003/04808, dated Aug. 19, 2003, 9pgs.

Supplementary European Search Report, International Application No. PCT/US2003/04808, dated Jun. 2, 2008, 3pgs.

International Search Report & Written Opinion, International Application No. PCT/US2010/027899, dated Oct. 20, 2010, 11pgs.

International Preliminary Report on Patentability, International Application No. PCT/US2010/027899, dated Sep. 20, 2011, 6pgs.

"Powder Metallurgy Design Manual," 3rd Edition, copyright Metal Powder Industries Federation, 1998.

U.S. Appl. No. 13/677,836, "Multi-Layered Coating Providing Corrosion Resistance to Zirconia Based Electrolytes," filed Nov. 15, 2012, Specification and drawings, 45 pgs.

U.S. Appl. No. 13/678,981, "Fuel Cell Interconnect Heat Treatment Method," filed Nov. 16, 2012, Specification and drawings, 43pgs.

U.S. Appl. No. 13/679,092, "Method of Making Fuel Cell Interconnect Using Powder Metallurgy," filed Nov. 16, 2012, Specification and drawings, 26 pgs.

International Application No. PCT/US13/27895, International Filing Date: Feb. 27, 2013, "Coatings for SOFC Metallic Interconnects," Bloom Energy Corporation, Specification and drawings, 67pgs.

Wilson et al., U.S. Appl. No. 13/409,629, "Coatings for Metal Interconnects to Reduce SOFC Degradation," filed Mar. 1, 2012, Specification and drawings, 27pgs.

Gerardo Jose la O' et al., "Investigation of Oxygen Reduction Mechanisms Using Cathode Microelectrodes Part I: Experimental Analysis of $La_{1-x}Sr_xMnO_{3-d}$ and Platinum," 207th Meeting of the Electrochemical Society, Quebec City, Canada, May 15-20, 2005.

J.W. Stevenson et al., "SECA Core Technology Program: Materials Development at PNNL," Pacific Northwest National Laboratory, Richland, WA, SECA Core Technology Review Meeting, Lakewood, CO, Oct. 25, 2005.

International Search Report & Written Opinion issued in PCT Application No. PCT/US2012/065508, dated Apr. 14, 2011.

Armstrong, T. et al., "Coatings for SOFC Metallic Interconnects," U.S. Appl. No. 13/781,206, filed Feb. 28, 2013.

Darga, D. et al., "Fuel Cell Interconnect Heat Treatment Method," U.S. Appl. No. 13/678,981, filed Nov. 16, 2012.

Herchen, H. et al., "Method of Making Fuel Cell Interconnect Using Powder Metallurgy," U.S. Appl. No. 13/679,092, filed Nov. 16, 2012.

Janousek, M. et al., "Iron Coated Chromium Powder and SOFC IC Made Therefrom," U.S. Appl. No. 13/301,151, filed Nov. 21, 2012.

Chu et al., "The Kinetics of the Reduction of Chromium Oxide by Hydrogen," Metallurgical Transactions B, vol. 10B, Sep. 1979, © American Society for Metals and the Metallurgical Society of AIME, pp. 401-407.

"Chromium" Wikipedia, the free encyclopedia webpage, 7pgs., Nov. 18, 2010, http://en.wikipedia.org/wiki/Chromium.

Hosokawa Micron Corp., Mechanofusion System© AMS-Mini, Product description, Table-Top Type Particle Composition Processor, Aug. 2003, 2pgs.

IPRP PCT/US2012/65531, mailed May 30, 2014.

WO International Search Opinion PCT/US2012/65531, dated Mar. 29, 2013.

Couse, S. et al., "Fuel Cell Interconnects and Methods of Fabrication," U.S. Appl. No. 13/678,709, filed Nov. 16, 2012.

Invitation to Pay Additional Fees for International Application PCT/US2014/058251, dated Jan. 2, 2015 (7 Sheets).

International Search Report and Written Opinion received in connection with international application No. PCT/US2014/058251; dated Feb. 23, 2015.

International Preliminary Report on Patentability and Written Opinion of the International Searching Authority for PCT International Application No. PCT/US2014/058251, dated Apr. 14, 2016, 10 pages.

Office Communication Pursuant to Rules 70(2) and 70a(2) for EP Application No. 14850914.4, dated Jun. 23, 2017, 1 page.

Extended European Search Report for EP Application No. 14850914.4, dated Jun. 6, 2017, 12 pages.

European Office Communication pursuant to Rule 164(1) and European Supplemental Search Report for EP Application No. 14850914.4, dated Mar. 3, 2017, 8 pages.

* cited by examiner

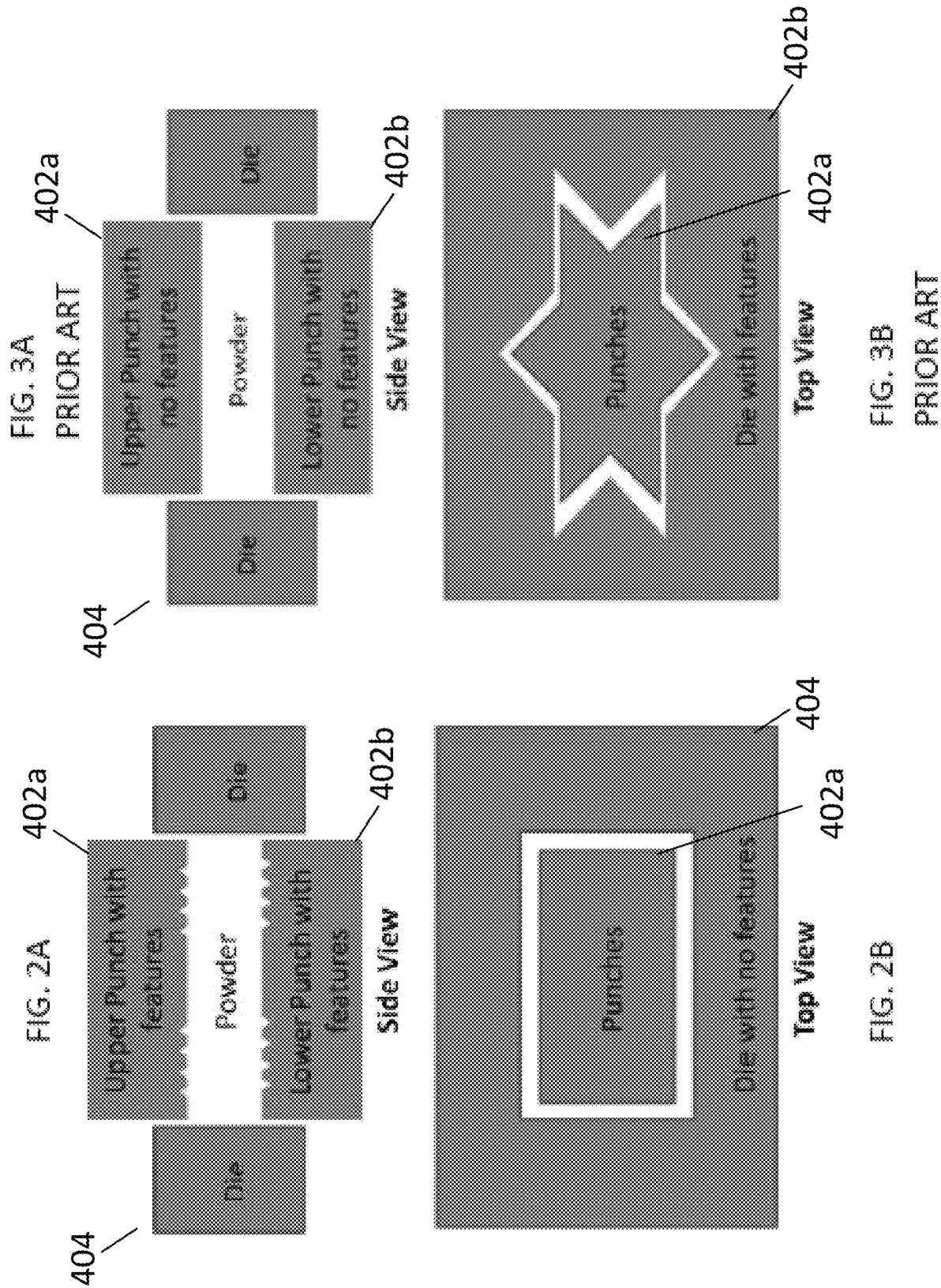

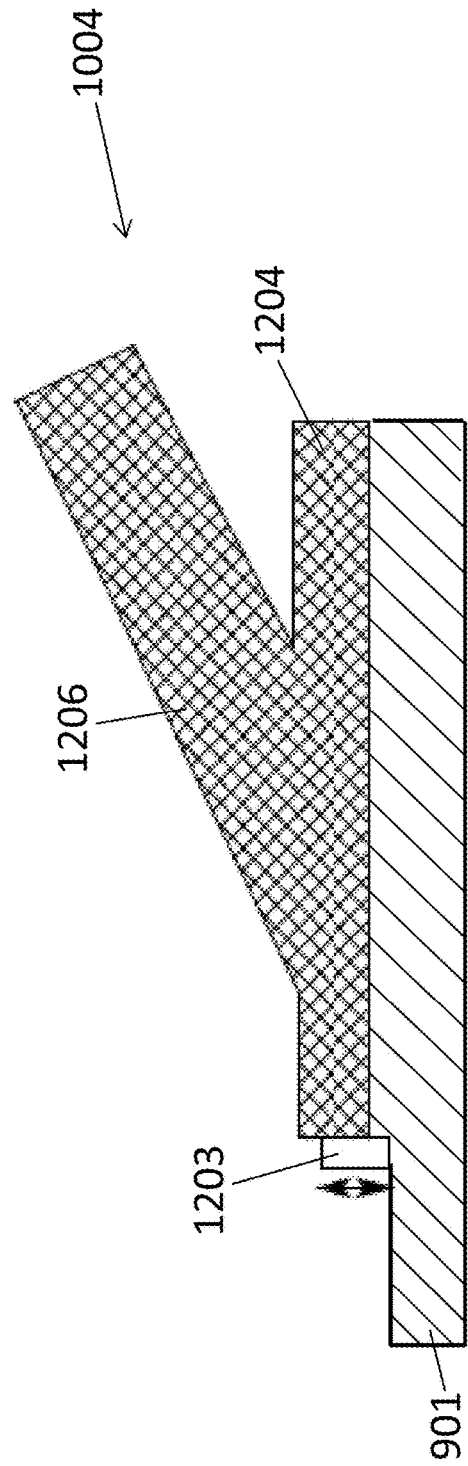
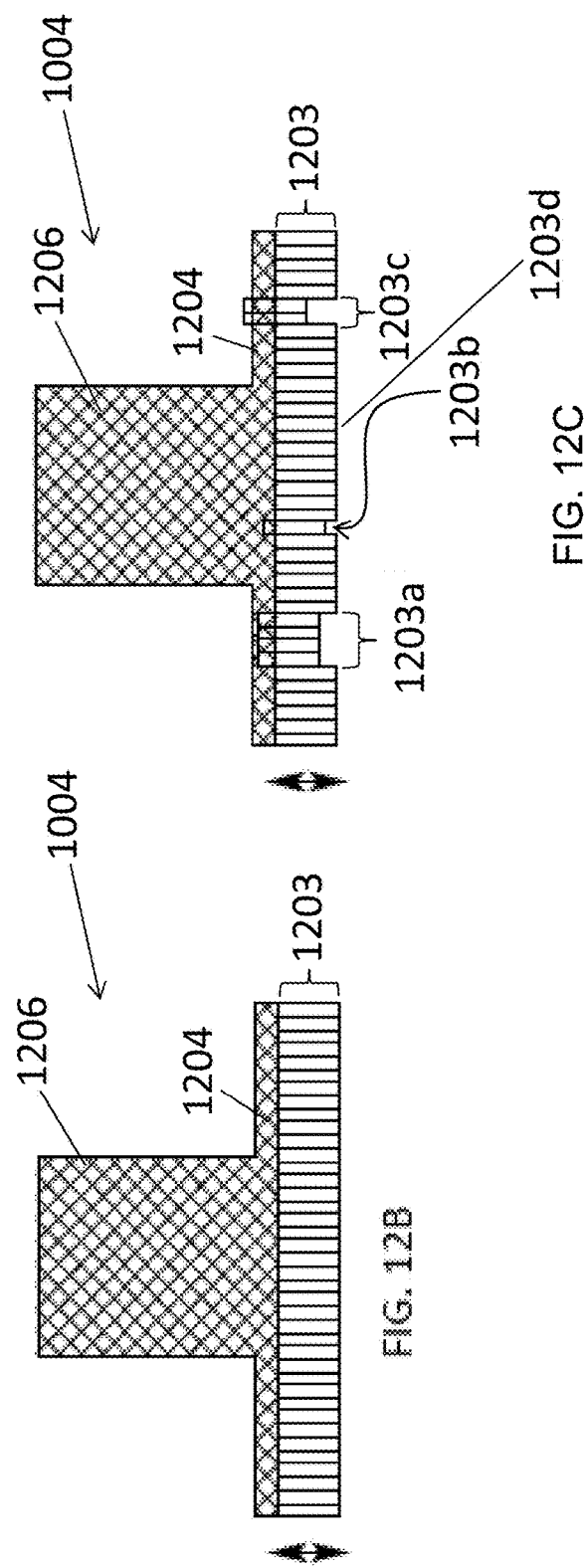

PRE-FORMED POWDER DELIVERY TO POWDER PRESS MACHINE

RELATED APPLICATIONS

This application is a divisional of U.S. application Ser. No. 14/501,572, filed Sep. 30, 2014, which claims benefit of priority to U.S. Provisional Patent Application No. 61/885,048, filed Oct. 1, 2013, the entire contents of which are incorporated herein by reference.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured.

SUMMARY

Embodiments include methods for fabricating an interconnect for a fuel cell system that include forming a metal powder into a preform structure, positioning the preform structure in a die cavity of a press apparatus, and compressing the preform structure in the press apparatus to form the interconnect.

In various embodiments, the preform structure may be formed with sufficient structural integrity to maintain its shape while the preform structure is positioned in the die cavity, and may be designed to break apart during compressing in the press apparatus. The preform structure may be made with or without a lubricant or organic binder.

In embodiments, a thickness of the preform structure is varied to provide a substantially uniform compaction ratio for regions of the interconnect having different thicknesses. The thickness of the preform structure may adjusted (e.g., by adding or removing powder) in select portions of the structure to control a density of a corresponding region of the interconnect. Critical regions of the interconnect may thereby be formed with higher density.

Further embodiments include methods for fabricating an interconnect for a fuel cell system that include providing a metal powder and at least one insert in a die cavity of a powder press apparatus, and compressing the metal powder and the insert in the press apparatus to form the interconnect, wherein the at least one insert provides reduced permeability in at least a portion of the interconnect. The at least one insert may be a sheet of a non-porous material, such as a metal foil. The at least one insert may be embedded within the pressed interconnect and/or over a surface of the interconnect.

Further embodiments include methods for fabricating an interconnect for a fuel cell system that include providing a metal powder mixed with at least one filler material in a die cavity of a powder press apparatus, compressing the metal powder and the filler material in the powder press apparatus to form the interconnect. The filler material may be a ceramic material (e.g., alumina) and/or a pore forming material.

Further embodiments include methods for fabricating an interconnect for a fuel cell system that include providing powder to a die cavity of a press apparatus, vibrating the powder into a desired shape in the die cavity, and compressing the powder in the press apparatus to form or the interconnect or a preform structure of the interconnect.

Further embodiments include interconnects formed in accordance with the above-described methods and systems configured to fabricate interconnects in accordance with the above methods.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 2A and 2B are respective side cross sectional and top views of a powder metallurgy (PM) apparatus for making interconnects for a fuel cell stack.

FIGS. 3A and 3B are respective side cross sectional and top views of a prior art PM apparatus.

FIGS. 12A-12C are cross-sectional views of a shoe with adjustable height scrapers.

DETAILED DESCRIPTION

Figure 1A:
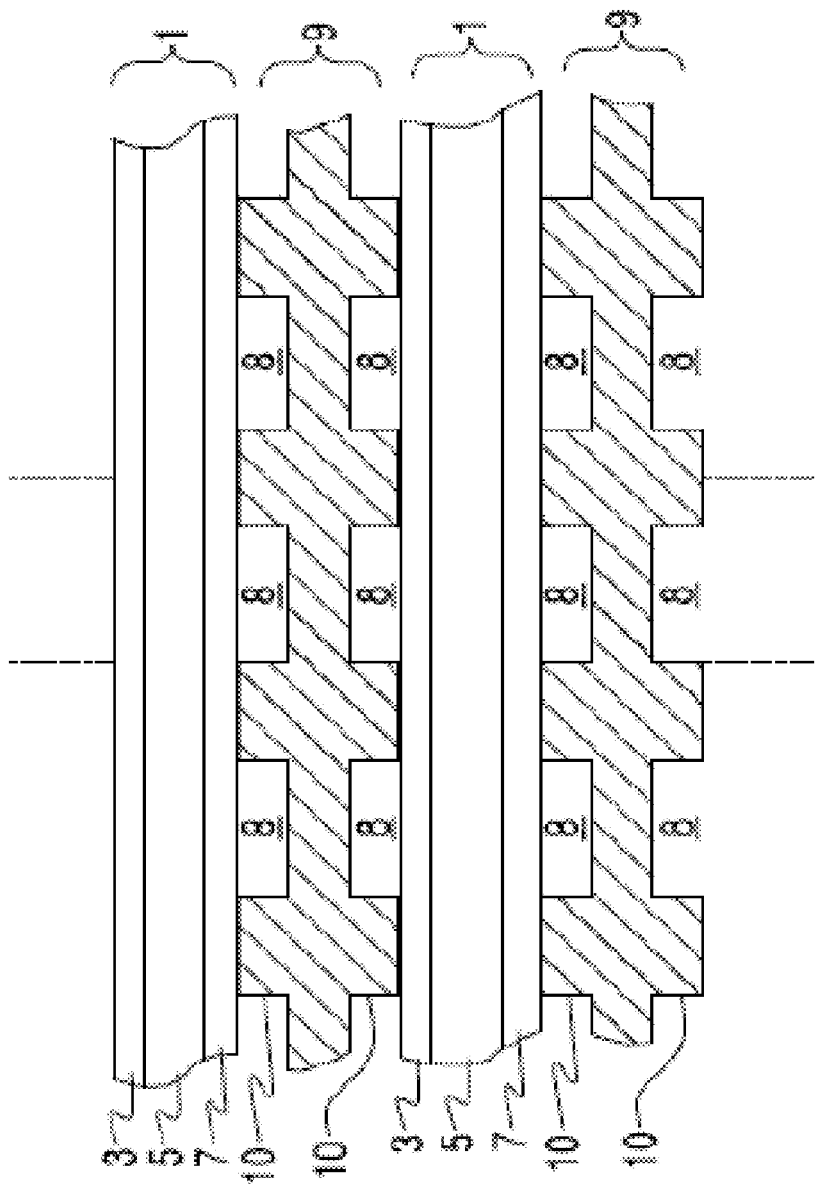
FIG. 1A illustrates a side cross-sectional view of a SOFC stack.

The various embodiments will be described in detail with reference to the accompanying drawing. Wherever possible, the same reference numbers will be used throughout the drawing to refer to the same or like parts. References made to particular examples and implementations are for illustrative purposes, and are not intended to limit the scope of the invention or the claims.

FIG. 1A illustrates a SOFC stack in which each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. FIG. 1 shows that the lower SOFC 1 is located between two interconnects 9.

Figure 1B:
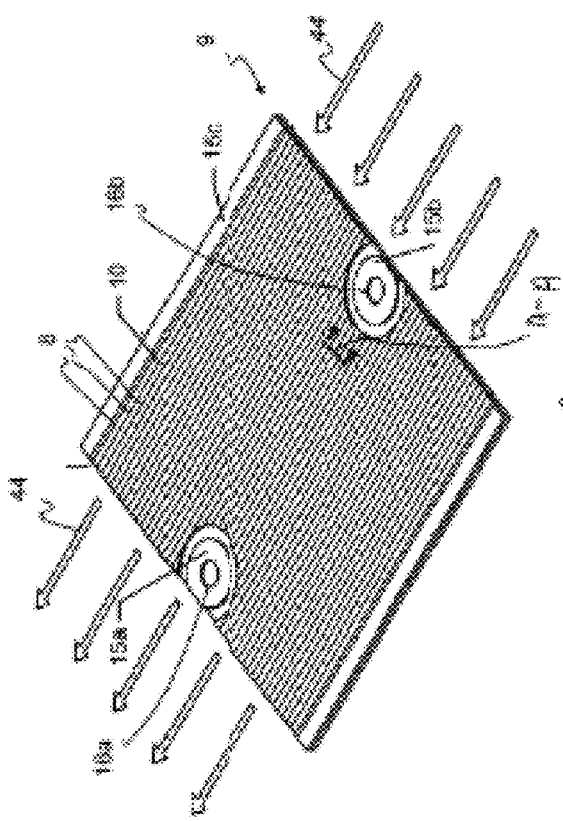
FIGS. 1B and 1C show, respectively, top and bottom views of an interconnect for a SOFC stack.
Figure 1C:
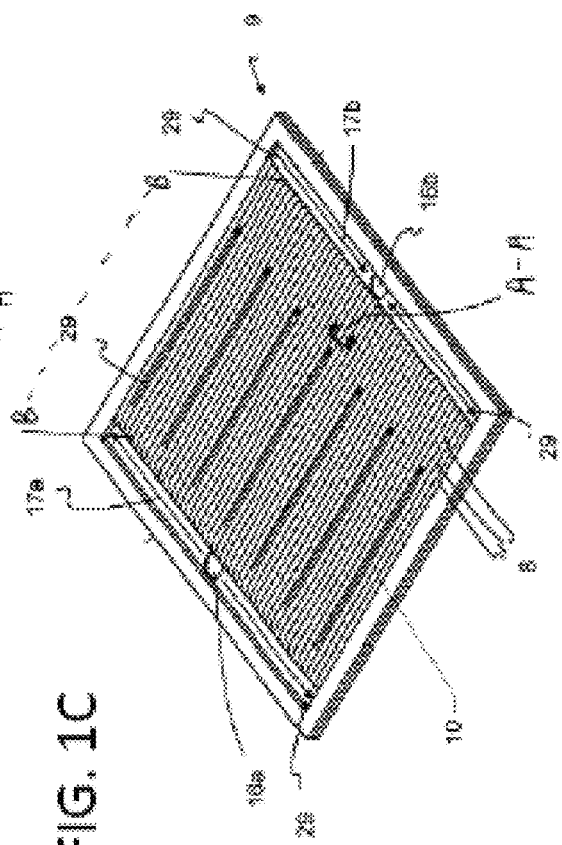

FIGS. 1B and 1C show, respectively, top and bottom views of an interconnect 9. The portions of interconnect 9 shown in side cross-section in FIG. 1A are provided along lines A-A in FIGS. 1B and 1C. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 1C, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 1B, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include a elevated top surface for contacting against the flat surface of the adjacent SOFC 1. A peripheral seal 15c can seal the anode-sides of the interconnect and fuel cell to prevent air from reaching the anode electrode of the fuel cell.

For solid oxide fuel cell stacks, the interconnect 9 is typically made from an electrically conductive metal material, and may comprise a chromium alloy, such as a Cr—Fe alloy made by a powder metallurgy technique. The powder metallurgy technique may include pressing and sintering a Cr—Fe powder, which may be a mixture of Cr and Fe powders and/or pre-alloyed Cr—Fe powder, to form a Cr—Fe alloy interconnect in a desired size and shape (e.g., a "net shape" or "near net shape" process). A typical chromium-alloy interconnect may comprise at least about 80% chromium, and preferably more than about 90% chromium, such as about 94-96% (e.g., 95%) chromium by weight. The interconnect may contain less than about 20% iron, and preferably less than about 10% iron, such as about 4-6% (e.g., 5%) iron by weight. The interconnect may contain less than about 2%, such as about zero to 1% of other materials, such as yttrium or yttria, as well as residual or unavoidable impurities.

In a conventional method for fabricating interconnects, blended Cr and Fe elemental powders are pressed in a hydraulic or mechanical press to produce a part having the desired interconnect shape. The Cr and Fe powders are blended with an organic binder and pressed into so-called "green parts" using a conventional powder metallurgy technique. The "green parts" have substantially the same size and shape as the finished interconnect (i.e., "near net shape"). The organic binder in the green parts is removed before the parts are sintered. The organic binder is removed in a debinding process in a furnace that is operated at atmospheric pressure at a temperature of 400° C. to 800° C., preferably in a reducing environment, such as under flow of hydrogen gas. After debinding, the compressed powder Cr—Fe interconnects are sintered at high-temperature (e.g., 900-1550° C.) to promote interdiffusion of the Cr and Fe. The interconnects may undergo a separate controlled oxidation treatment, such as by exposing the interconnects to an oxidizing ambient, such as air at high temperature after sintering, prior to use of the interconnects in the stack.

Powder metallurgy (PM) technology creates the shape of a part using three components in a compaction press—the upper punch 402a, the lower punch 402b, and a die 404. The design of the interconnect necessitates various cross sectional thickness to be molded by features on the punches, i.e., there is cross sectional thickness variation in the direction of compaction tonnage (FIGS. 2A and 2B). This is different from most parts that are processed using PM technology where the punches 402a, 402b are typically flat and the die 404 is the component that contains the geometric features, i.e., the cross sectional thickness in the direction of compaction tonnage is uniform (FIGS. 3A and 3B).

Various embodiments include improved methods of fabricating interconnects using powder metallurgy. In one embodiment, at least a portion of the metal powder is formed into a powder preform structure that is loaded into a die cavity of a powder press apparatus, and the powder is compressed to form the interconnect. The preform structure may have a size and shape that provides a desired compaction ratio of the powder in the die cavity to the pressed powder interconnect, independent of the topography of the upper and lower punches of the powder press apparatus. In embodiments, the compaction ratio may be substantially uniform across the interconnect. In some embodiments, the preform structure may be provided with extra powder in regions corresponding to critical regions of the final interconnect in order to provide higher density in these critical regions. In a non-limiting embodiment, the lower and/or upper surface of the preform is not flat and contains protrusions and depressions, and/or the preform has thicker and thinner parts (i.e., it has a non-uniform thickness along its length). Embodiments of the method may also provide a significant increase in throughput of a powder press apparatus by reducing the powder delivery time and/or eliminating the requirement of a separate powder delivery apparatus (e.g., a "fill shoe").

Figure 4:
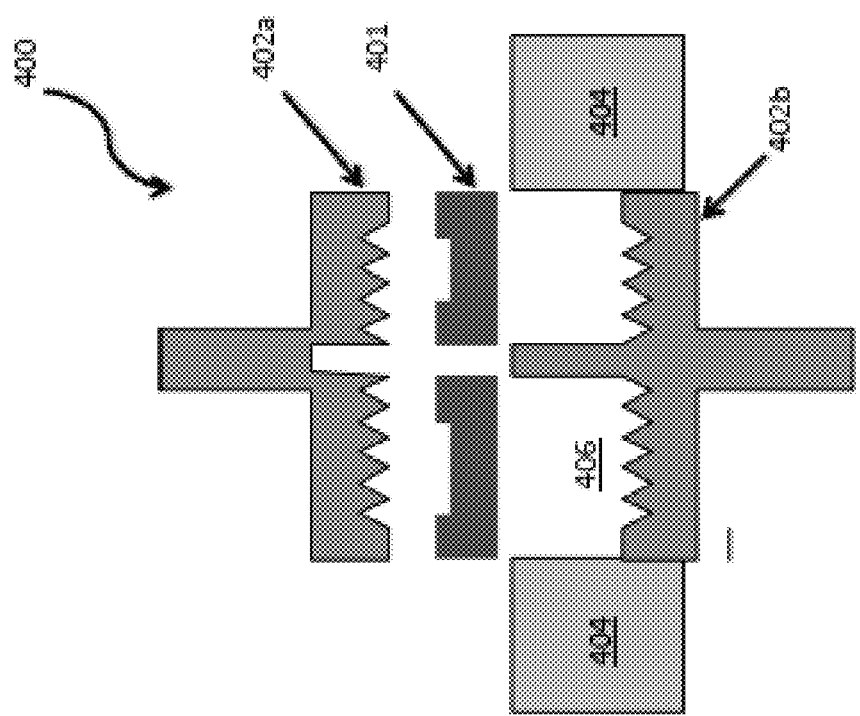
FIG. 4 is a side cross-sectional schematic view of a powder press apparatus with a powder preform structure being placed within a die cavity of the apparatus.

FIG. 4 schematically illustrates a powder preform structure 401 being positioned within a die cavity 406 of a powder press apparatus 400. In order to press a part with sufficient density throughout the part, typically the powder within the die 404 must be strategically distributed before pressing the part. In a conventional process for fabricating pressed powder interconnects, this is typically accomplished by a device adapted for delivering the powder to the die 404 (i.e., a "fill shoe," not shown in FIG. 4), and/or by swiping the delivered powder (i.e., removing powder from select regions of the die 404). In the embodiment illustrated in FIG. 4, at least a portion of the powder in the die 404 is formed into a preform structure 401 (which may also be referred to as a powder "patty" or "cookie") having sufficient structural integrity to maintain its shape while it is positioned within the cavity 406 of the powder press die 404. This may enable a much more precise and reproducible fill of the die 404. The shape of the preform structure 401 is not necessarily close to the shape of the final interconnect (i.e., it is not "net shape" or "near net shape"), and may lack fine features of the final interconnect, such as the individual ribs 8 and channels 10 defining the flow field(s) of the interconnect, inlet and outlet plenums 17a, 17b, and/or flat elevated surfaces on which the seals 15a-c are placed (see FIGS. 1A-C). Fine features of the interconnect may be defined by the upper and lower punches 402a, 402b during compaction of the powder. In embodiments, the powder preform structure 401 may have a varying thickness in different regions of the structure 401 which allows the amount of powder in the corresponding regions of the final pressed interconnect to be more effectively controlled. A material or fabrication process used to form the preform structure 401 (e.g., glue, organic binder, etc.) may be strong enough to allow the structure 401 to be transported into the press 400, but weak enough (e.g. brittle, so it breaks down in the initial moment of compression) not to interfere with the flow of the powder during pressing of the part. U.S. Pat. No. 8,173,063 discloses a double press method for forming an interconnect. However, the first press forms an interconnect which is different from a pre-form structure 401 because it does not collapse into powder during the second pressing step as does the pre-form structure 401 of the present embodiments. Also, the first press in the double press technique defines the individual fine features (e.g., ribs, channels, etc.) of the finished interconnect in exaggerated form, whereas the pre-form structure 401 may lack such fine features. In embodiments, a lubricant (e.g., organic binder) which is typically used to form the powder pressed "green part," as described above, may also serve the function of (temporarily) adhering the powder in a preform structure 401 for loading into the press, and may be, for example, a wax. In other embodiments, as described below, the powder preform structure 401 may be formed without the use of a lubricant or separate binder or bonding agent. A variety of materials and technique can be applied to create the initial shape (e.g., pressing or compacting powder with or without further additives).

Embodiments may overcome the inherent imbalance in the powder distribution when the shoe fills the die cavity to a relatively flat profile. The reason is that in conventional powder press systems, the powder delivery shoe traverses the die cavity, depositing the available powder with a flat topography (i.e., a flat upper surface of the filled powder). The lower punch can be actuated to move up or down during this fill to have some control of the amount of powder left by the shoe, but that still has limitations in the distribution in a transverse direction to the direction of the shoe travel.

The powder delivery by the shoe is a significant (30%) portion of the cycle time to compact powder into a part. In the embodiment using the preform structure, it will be seen that the delivery can be effected much more quickly, reducing the cycle time, and increasing the number of parts made per minute.

In embodiments, a method of fabricating an interconnect for a fuel cell includes making a shaped pre-form structure 401 of the powder, where the powder volume is adjusted to be what is needed for the final part. This may include making adjustments for regions of higher or lower density in the final interconnect, as well as to accommodate features of the die 404, such as core rod(s) or the inner walls of the die 404. Adjusting for higher or lower density in the finished interconnect may be accomplished by adding or subtracting powder from regions of the pre-form structure 401 corresponding to the desired regions of high and/or low density in the final interconnect. At the core rod or die wall, the pre-form structure 401 may be configured to be offset slightly leaving a small gap (e.g., 0.1-1.0 mm, such as 0.1-0.5 mm, including about 0.3 mm) between the edges of the preform structure 401 and the side walls and core rods of the die 404, in order to allow clearance during delivery of the pre-form structure 401 into the die 404. Additional powder may be provided at the locations proximate to the core rods and die edges (e.g., the thickness of the preform structure 401 may be increased proximate to the gaps) to provide sufficient powder to fill the gap regions during compaction.

The powder may be formed into a preform structure 401 without lubricant, as described above. For metal powder without lubricant, the powder will stick together at a reasonable pressure, leaving a "cookie" of the pre-formed powder available for delivery to the press. The preform structure 401 may be formed and maintained at room temperature (e.g., 20-23° C.). When the preform structure 401 is fabricated with a lubricant (e.g., wax), higher pressure may be needed to keep the preform in the desired shape. An alternative includes cooling the powdered metal and lubricant to increase the viscosity of the lubricant so that the preform structure does not deform before it is delivered to the main powder press tool. This may enable the powder to be formed into a preform structure 401 using lower pressure and less expensive equipment. Similarly, a lubricant that is more viscous at room temperature may be used to enable the preform structure to be made less expensively at lower pressures.

The preform structure 401 may be formed in a different die press apparatus than the apparatus 400 used to form the interconnect.

Figure 5A:
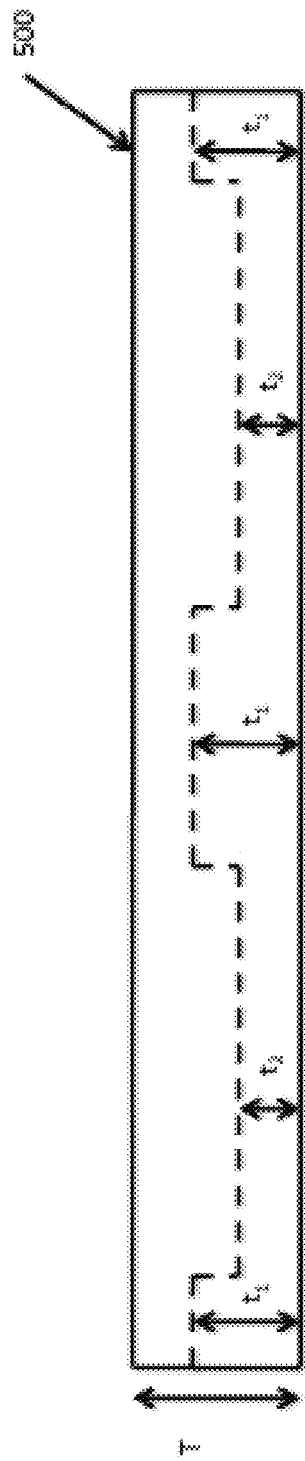
FIG. 5A is a side cross-sectional view of metal powder loaded into a die cavity using a conventional fill shoe.

FIG. 5A schematically illustrates the profile of a metal powder 500 after loading into a die cavity using a conventional "fill shoe." As shown in this figure, the shoe fills the die cavity to a relatively flat profile (i.e., with a flat upper surface). The compaction ratio for a powder press apparatus having upper and lower punches is the ratio of the initial powder thickness (T in FIG. 5A) to the thickness (t) of the final component after compaction. Many powder pressed parts, such as interconnects, have non-uniform thicknesses. This is indicated by the dashed line in FIG. 5A, which schematically illustrates the final thickness (i.e., $t_1$, $t_2$, etc.)

of different regions of an interconnect 9. For example, referring to FIGS. 1A-C, the flat elevated surfaces of an interconnect 9 on which the window seals 15c and donut seals 15a, 15b sit may have a first thickness, while the regions corresponding to the fuel and air flow fields may have a second, reduced thickness, particularly where the flow fields have an offset configuration, such that the ribs 8 on the anode-facing side of the interconnect are aligned with the channels 10 on the cathode-facing side, and vice versa. Additional regions of the interconnect 9, such as fuel inlet and outlet plenums 17a, 17b, may have an even smaller cross-sectional thickness.

For components with non-uniform thickness, the compaction ratio (T/t) will vary across the part, as shown in FIG. 5A. If the compaction ratio is not equal across the part, then the powder would need to flow laterally (i.e., transverse to the direction of compaction) to even this out and provide an interconnect having a relatively uniform density. However, the friction is so high that the powder can only move small amounts laterally during compaction.

Figure 5B:
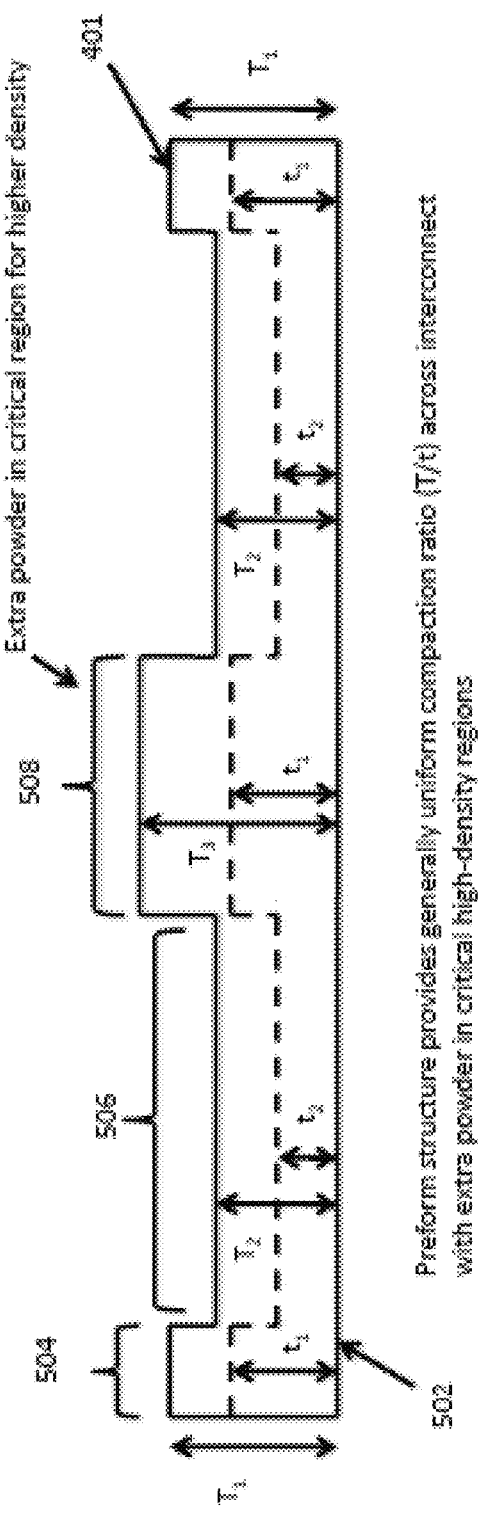
FIG. 5B is a side cross-sectional view of a powder preform structure having a varying thickness.

In various embodiments, a powder preform structure 401 as described above may be configured to provide a substantially uniform compaction ratio (T/t) across the interconnect. In embodiments, a thickness, T, of the preform structure 401 may be varied to substantially correspond to thickness variations in the final pressed interconnect. Thus, as shown in FIG. 5B, the preform structure 401 may have a first thickness, $T_1$, in a peripheral region 504 which corresponds to the periphery of the final interconnect having a thickness $t_1$, and a second reduced thickness, $T_2$, in an interior region 506 which corresponds to the flow field region(s) of the final interconnect having a reduced thickness $t_1$. Put another way, the powder preform structure 401 may be essentially a vertically expanded example of the thickness map of the final pressed part. A substantially uniform compaction ratio (T/t) may be obtained over the interconnect.

A surface 502 of the preform structure 401 (e.g., the bottom surface in FIG. 5B) may have a relatively flat profile. This surface 502 may be placed facing up in the die cavity of the powder press apparatus, and additional powder (if needed) may be deposited over the surface 502 of the preform structure 401 using conventional techniques (e.g., a powder delivery shoe). The additional powder may be deposited as a layer having a uniform thickness.

In another embodiment, the preform structure 401 may also enable more effective control of the density of the final interconnect. For example, as shown in FIG. 5B, the thickness of the preform structure 401 may be increased in regions corresponding to critical areas of the interconnect, such as in the areas surrounding the fuel holes (e.g., fuel inlet and outlet riser openings) 16a, 16b (see FIGS. 1B-C). As shown in FIG. 5B, the preform structure 401 has an increased thickness, $T_3$, in region 508 (i.e., the thickness $T_3$ in region 508 is greater than is required to provide the desired uniform compaction ratio). The use of regions with extra powder relative to what would be required for a uniform compaction ratio allow extra density in these regions. This can remove the requirement for the powder metallurgy chamfer which is used to make sure the interconnect is leak tight. A powder metallurgy chamfer may refer to a region of extra compaction along an edge of a part, such as the inner edge of the holes (e.g., fuel holes) in a pressed powder interconnect. The punches of the powder press apparatus may include a small protrusion that provides the extra compaction along the edge(s) of the part, forming the chamfer feature and reducing the permeability of the part. However, these small protrusions can break off or deform, particularly when a high velocity compaction is employed, which can limit the lifetime of the punch to unacceptable levels. By providing excess powder in critical areas of the interconnect, such as surrounding the fuel holes, the protrusions used to form the chamfer may be eliminated, thus improving the useful life of the punch.

The peripheral equipment used to make the preform structure 401 may include an apparatus (e.g., a small press, roller, etc.) that is configured to form the preform structure into the desired shape, and a device to deliver the preform structure to the main powder press apparatus while maintaining its shape. A small press may be a lower tonnage press, which is much less expensive than a high tonnage press 400 used to press the interconnect into net or near net shape. For powder with lubricant, a refrigerator to cool the powder and pre-form structure may be used to keep the preform structure in one piece.

Figure 6:
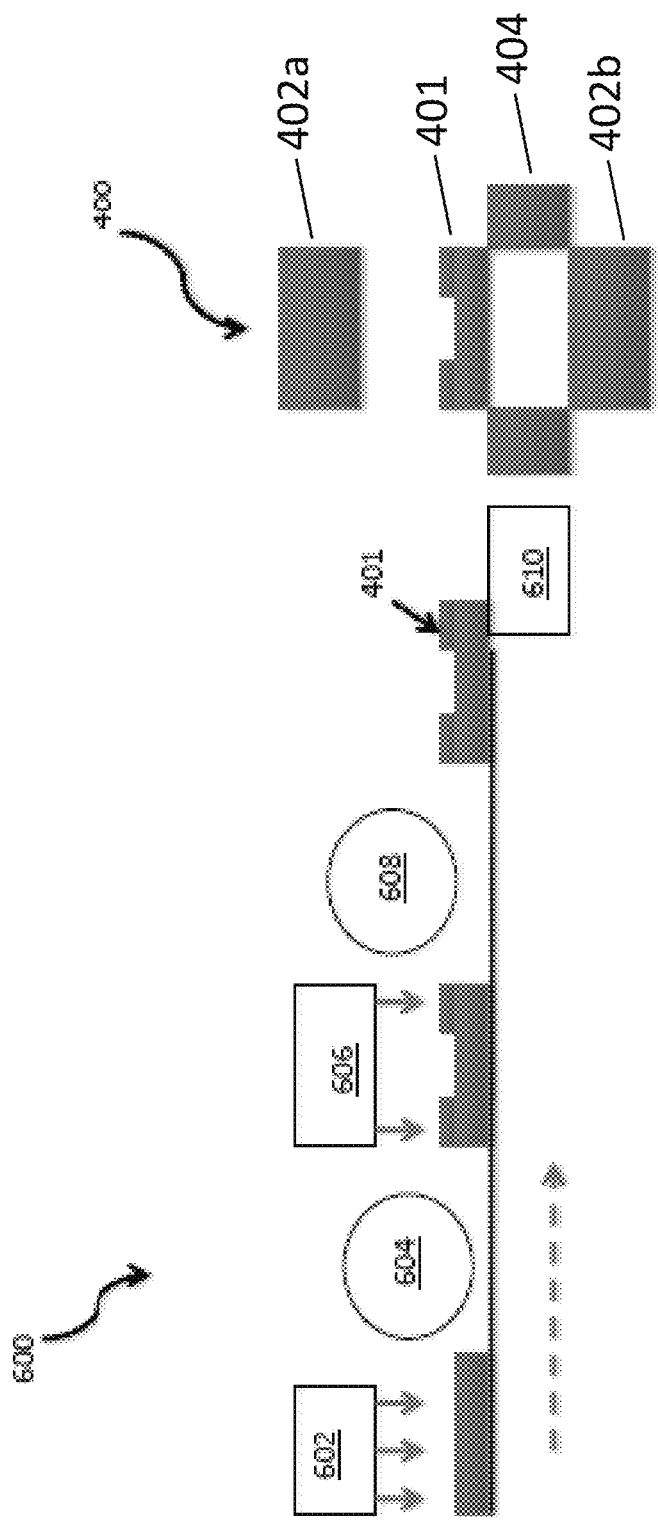
FIG. 6 is a schematic illustration of a continuous feed system for forming a powder preform structure for delivery to a powder press apparatus.

FIG. 6 illustrates an embodiment of a continuous feed system 600 for forming a powder preform structure 401 for delivery to a powder press apparatus 400. An initial quantity of powder may be deposited using a first powder deposition apparatus 602. The powder may be deposited as a layer having a uniform thickness and flat topology. The deposited powder may then be fed (e.g., using a belt or other conveying mechanism) to a first compaction apparatus 604 (as indicated by the dashed arrow in FIG. 6). The compaction apparatus 604 may include a roller or wheel that is configured to compact the powder to form an initial pre-form structure. A second powder deposition apparatus 606 may then selectively deposit additional quantities of powder in one or more areas corresponding to regions of increased thickness and/or increased density requirements in the final interconnect. The additional powder may be compacted by an additional compaction apparatus 608. This process may repeat until the preform structure 401 has a desired thickness profile. The preform structure 401 may then be inserted into the powder press apparatus 400 using an automated handling system 610 (e.g., a robotic system), and the preform structure 401 may be compacted (optionally with additional preformed powder structure(s) and/or loose powder) to form the interconnect. Advantages of this embodiment include high-throughput and reduced cost due to the relatively low cost of the compaction apparatus (e.g., wheels 604, 606) used to form the powder preform structure. In embodiments, the separate fill shoe for the main powder press apparatus 400 may be eliminated.

Figure 7:
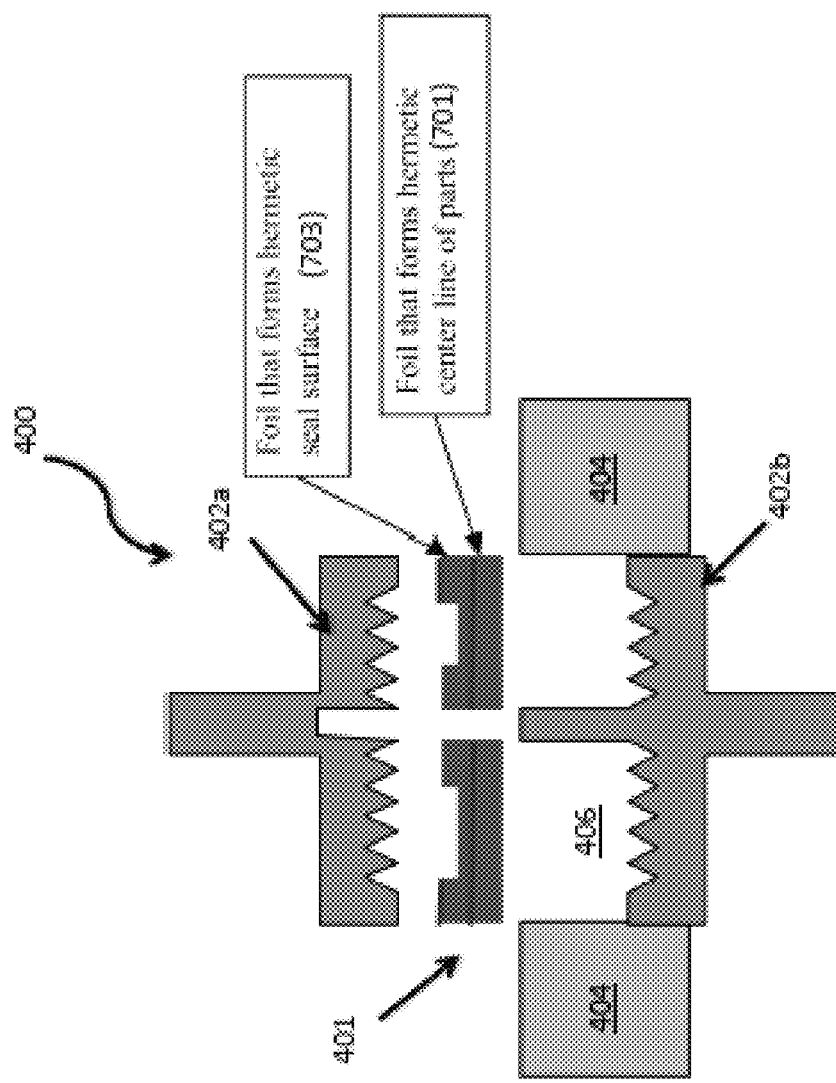
FIG. 7 is a side cross-sectional schematic view of a powder press apparatus and metal powder having foil inserts being loaded into the die cavity of the apparatus.

Further embodiments include methods of fabricating an interconnect using powder metallurgy that include providing a thin, non-porous insert within the die cavity with the metal powder stock and pressing the metal powder and the insert to form the interconnect. FIG. 7 schematically illustrates a plurality of inserts 701, 703 being placed with metal powder within a die cavity 406 of a powder press apparatus 400. The inserts 701, 703 may each comprise a continuous sheet of metal foil that extends generally transverse to the direction of compaction. In the embodiment of FIG. 7, a first foil insert 701 extends over substantially the entire "footprint" of the die cavity 406 and includes powder both above and below the insert 701. After powder pressing, the first insert 701 is embedded within the pressed powder interconnect. A pair of smaller inserts 703 are provided over portions of a surface of the powder stock. After pressing, the inserts 703 are bonded to a surface of the interconnect. The powder may comprise one or more preform structures 401, as described above, and the insert(s) 701, 703 may be embedded within the preform structure 401, placed on a surface of a preform structure 401, or positioned between preform structures 401, as appropriate. Alternatively, the insert(s) 701, 703 may be placed on, below and/or embedded within loose powder within the die cavity 406 (e.g., the die may be partially filled with powder, insert 701 may be placed over the powder followed by additional powder delivery, and insert(s) 703 may be placed on top of the powder prior to compaction).

A pressed metal powder interconnect should have sufficient density to separate the fuel from the oxidizer and not let the fuel attack the seal from "underneath" (i.e., from within the interconnect). Currently, this density requirement is achieved by optimizing (e.g. maximizing) the density of the pressed part and optionally by pre-oxidizing the part to reduce the remaining porosity.

Applicants have discovered that an interconnect need not be completely gas impervious throughout its entire thickness and thus the requirements of high density and low porosity may be relaxed. Separation of fuel and oxidizer has to be only good enough not to affect the performance of the device. If some fuel and oxidizer mix (react) fuel will be lost (reduction in efficiency) and heat will be generated (which will have to be removed). If the amount of gas reacting is small (enough) the impact of performance may become negligible.

One way to obtain the desired degree of gas impermeability (i.e., hermeticity) in an interconnect is to include prefabricated components in the pressing process. In one embodiment as shown in FIG. 7, one or more inserts 701 (e.g., a thin foil) with the same size/shape as the footprint of the interconnect may be provided in the die cavity 406 along with the powder to be pressed. The insert 701 may slightly deform during pressing but may provide a hermetic barrier within the final interconnect. If there is a hermetic barrier within the interconnect, the remainder of the interconnect can be left more porous. This allows use of less material and/or lower compression forces (cheaper tools, larger part, etc.). This may also eliminate the need for pre-oxidation of the interconnect. Pre-oxidation also serves to obtain a compatible coefficient of thermal expansion (CTE), which can be alternatively realized with a modified (optionally cheaper) powder mixture.

Another sensitive area within the interconnect are the seal areas where fuel has to be kept from attacking the seals from within the interconnect. Alternatively or in addition to the insert 701 described above, one or more additional inserts 703 (e.g. foils) can be placed into the die cavity, above or below the powder, in regions corresponding to seal areas of the interconnect (e.g., toroidal regions of the interconnect surrounding the fuel risers 16a, 16b which support the toroidal or "donut" shaped seals 15a, 15b on the air side of the interconnect as shown in FIG. 1B). After pressing, the insert(s) 703 are bonded to the pressed powder interconnect and serve as the sealing surface in these regions of the final interconnect. In this way, increased gas impermeability (i.e., hermeticity) may be realized in the sealing surface in regions under seals 15a, 15b.

The inserts 701, 703 (e.g., foils) may be made from the same material as the powder used for pressing or from a different material (e.g., Cr—Fe alloy). If the insert 701, 703 is thin enough a certain degree of CTE mismatch between powder and the insert is permissible.

The inserts 701, 703 as described above may be utilized in combination with the powder pre-formed structure 401 (e.g., "patties" or "cookies") as described above in connection with FIGS. 4-6.

In embodiments, multiple powder preform structures 401 and/or inserts 701, 703 with different properties may layered in the die cavity before pressing (or a combination of lose powder and preform structures/inserts may be positioned in the die cavity) to provide a functionally graded component. Not every layer has to fulfill all functions. A small layer satisfying hermeticity may be sufficient to separate air and fuel.

Figure 8:
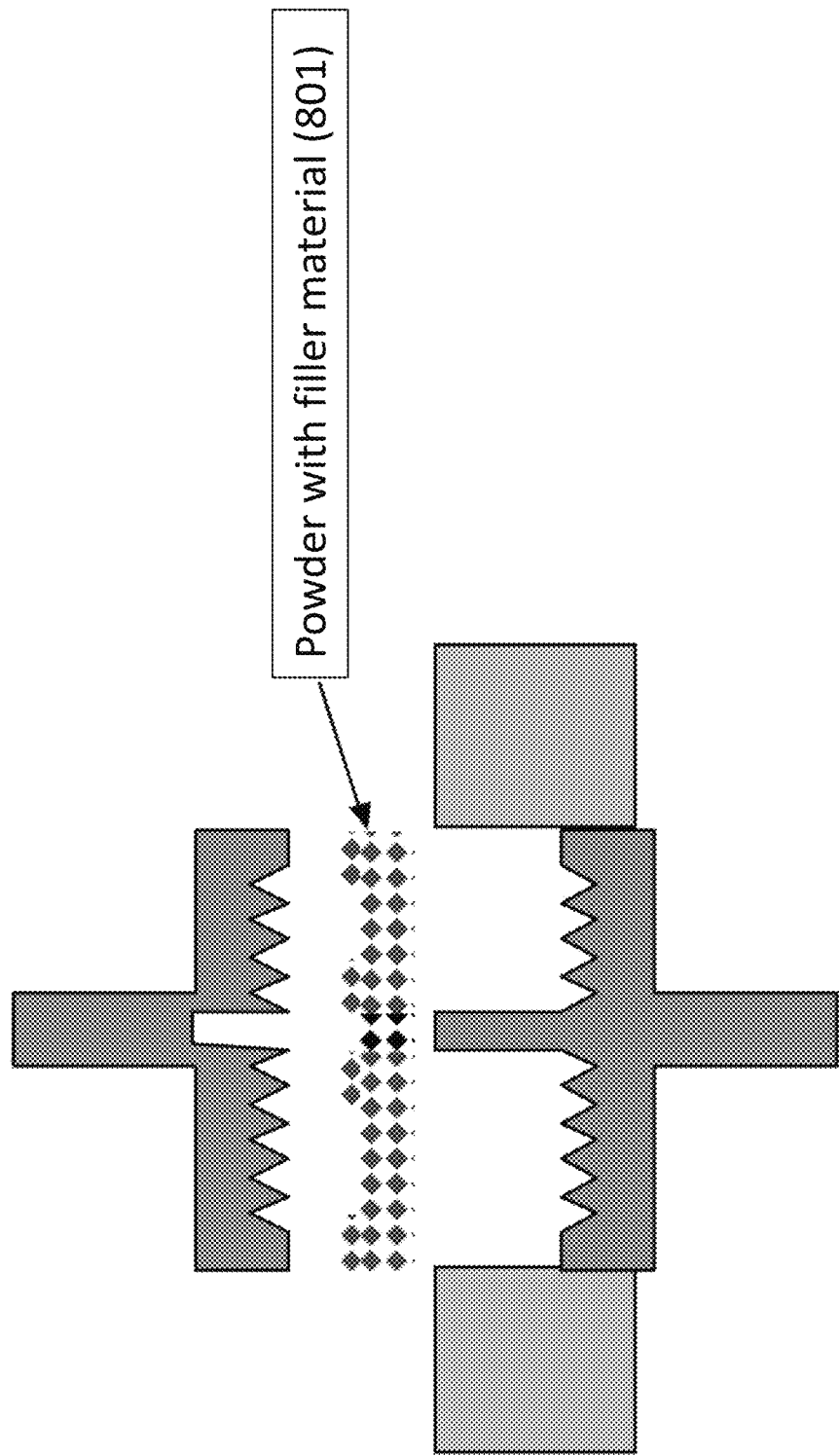
FIG. 8 is a side cross-sectional schematic view of a powder press apparatus and metal powder having filler material being loaded into the die cavity of the apparatus.

FIG. 8 schematically illustrates an additional embodiment of fabricating an interconnect using powder metallurgy in which filler material 801 is included in the metal powder stock. The cost of chromium is a cost driver for conventional interconnects. Applicants have discovered that it is possible to maintain functionality of the interconnect while substituting part of the Cr/Fe powder with other materials, including non-metal materials such as ceramics. For example alumina may be used as a filler material. In embodiments, up to about 8% by weight (e.g., 3-6% by weight) of the metal powder stock may be substituted by a filler material, such as alumina and/or other ceramic materials. The filler material may be in powder form that is mixed with the metal powder mixture, and may be included in a powder preform structure as described above. The filler material (e.g., alumina) may have a different CTE than the metal powders (e.g., Cr—Fe) and would therefore alter the CTE of the pressed part. This can be corrected by adjusting the composition of the base metal powder (e.g., modifying the amount of Cr and Fe in the powder until the mixture produces the desired CTE). The filler may be selected such that it can survive the pressing and the sintering process.

In some embodiments, all or a portion of the filler material may comprise pore formers. In other words a filler material is used that leaves behind voids (pores). In general this is undesirable and may cause functional problems, but if the pore formers are applied locally (in areas of the interconnect where porosity is acceptable) or if combined with inserts that provide sufficient hermeticity, as described above, pore formers may be utilized. Pore formers may be organic particles which turn to gas and escape during sintering/debindering to leave voids.

Selective inclusion of pore formers may also extend the functionality of the interconnect. Internal flow passages may be created, and pores in the interconnect may enhance catalysis of fuels.

Because interconnects are being designed thinner and thinner, their density and topographical uniformity are becoming more sensitive to the shape of the metal powder prior to compaction into an interconnect. Further embodiments, illustrated in FIGS. 9A-9F, provide complex interconnect shapes in a high throughput production environment.

Figure 9A:
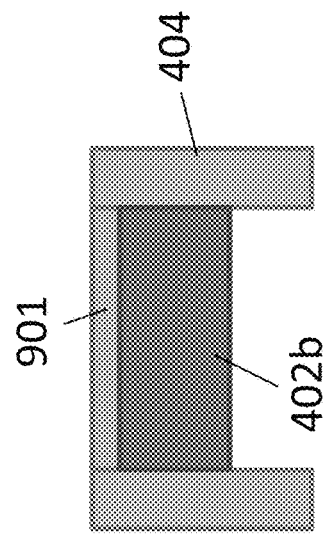
FIGS. 9A-9F are side cross-sectional schematic views of a powder press apparatus used in a powder pressing method of another embodiment.
Figure 9B:
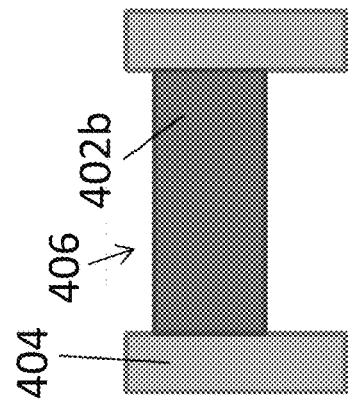
Figure 9C:
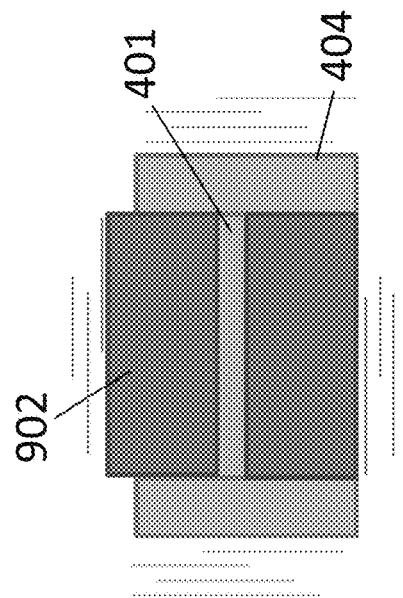

As shown in FIG. 9A, a preform structure may be formed by providing the metal powder in the die cavity of a powder press apparatus and shaping the metal powder with an upper shaping punch to form the metal powder into the preform structure positioned in the die cavity of the press apparatus. In steps 1 and 2 shown in FIGS. 9A and 9B, the metal powder 901 can be placed in a die cavity 406 formed by a lower tool (e.g., lower punch 402b) and an outer mold frame (e.g., die 404). In step 3, the metal powder 901 may be shaped by pressing the upper shaping punch 902 into the metal powder. In some embodiments, shaping the metal powder with the upper shaping punch may comprise of vibrating at least part of the powder press apparatus and/or rotating at least part of the powder press apparatus. The shape of the upper shaping punch 902 can be determined to shape the metal powder into the preform 401 shape by measuring the topography of the shaped powder, and designing the upper shaping tool to match this shape.

Figure 9D:
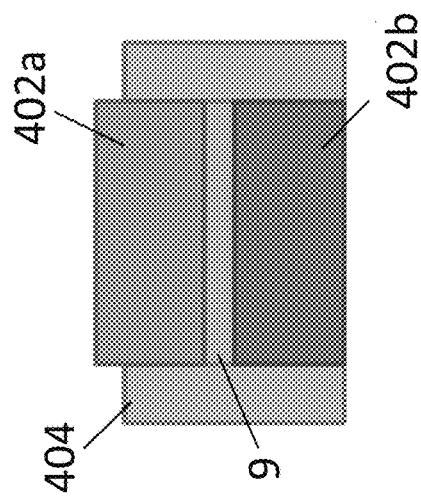

In an embodiment, shaping the metal powder 901 with the upper shaping punch 902 may be followed by removing the upper shaping punch 902, inserting the compaction punch 402a into the die 404 cavity 406, and compressing the preform structure 401 with the upper compaction punch in the powder press apparatus to form the interconnect 9, as illustrated in step 4 of FIG. 9D.

Figure 9F:
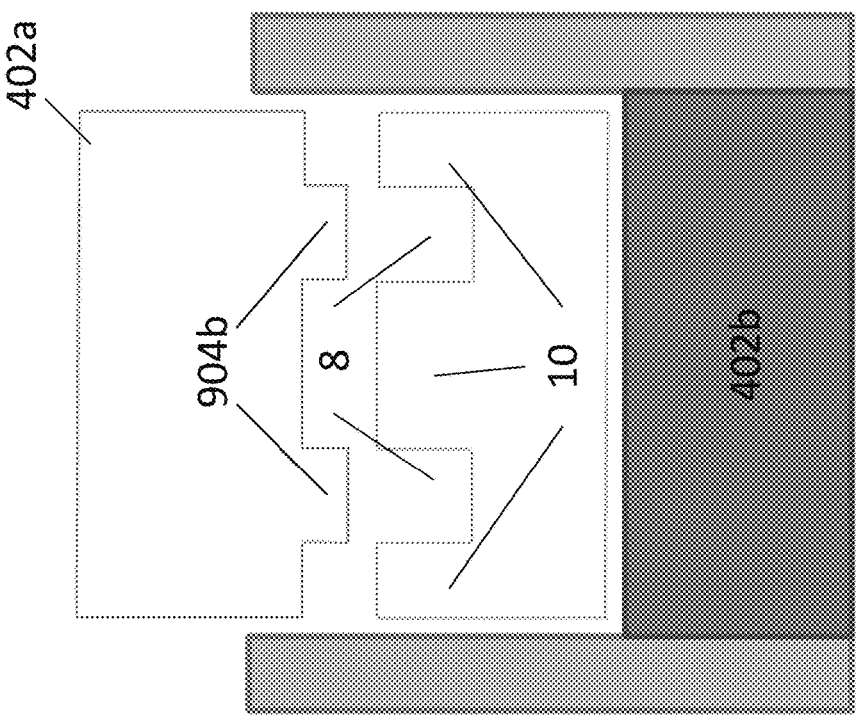
Figure 9E:
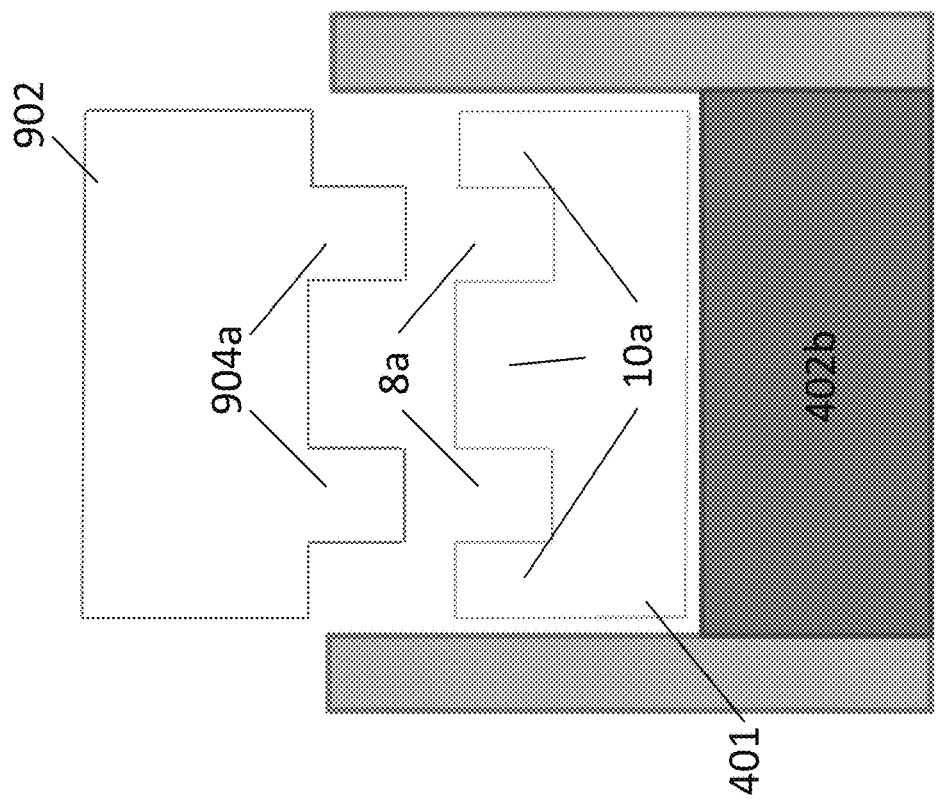

A further embodiment may allow for the control of the compaction ratio by ensuring that the shape of the preform 401 is different from the shape of the interconnect. In an embodiment, at least one channel 8a between ribs 10a in the preform 401 is deeper than at least one channel 8 between ribs 10 in the interconnect 9. As illustrated in FIGS. 9E and 9F, respectively, least one protrusion 904a in the upper shaping punch 902 is longer than at least one corresponding protrusion 904b in the upper compression punch 402a. Thus, the upper shaping punch 902 is a different punch from the upper compaction punch 402a. The lower punch 402b may be the same punch or different punches during the shaping step in FIG. 9C and the compaction step in FIG. 9D.

The embodiments described above improve interconnect characteristics by decoupling metal powder dispensation from shaping. These embodiments improve process simplicity and reduce cost of equipment. These embodiments also provide relatively complex powder shaping capability in a relatively short amount of time.

Non-uniform density distribution after compaction can create major issues in interconnects. For example, density variation can create weak spots on the interconnect, increasing the risk that the interconnect will become permeable to the separate fuel and air. Density variation can also cause the interconnect to reach the highest density at the thinnest region, inhibiting the feasibility of improving density in other areas of the interconnect. The following embodiments can achieve complex three dimensional powder shaping to provide accurate powder control during the compaction process to promote control during the compaction process.

In one embodiment illustrated in FIGS. 10A-10E, an insert may be used during the powder fill process to substitute powder volume, and final powder shape is achieved after the insert is vertically removed. The amount of powder removal can be controlled by the thickness of the insert, and the insert design can achieve complex powder shaping contours to accommodate the desired thickness variation of interconnect geometry. Forming a metal powder into a preform structure may comprise providing a lower portion of the metal powder in the die cavity of a powder press apparatus, providing an insert covering at least part of the lower portion of the metal powder, providing an upper portion of the metal powder on the lower portion of the metal powder, and removing the insert vertically from the metal powder to form a desired metal powder shape. An embodiment may further comprise moving the lower tooling 402b of the cavity 406 to adjust cavity volume for the lower portion of the metal powder and/or the upper portion of the metal powder.

Figure 10A:
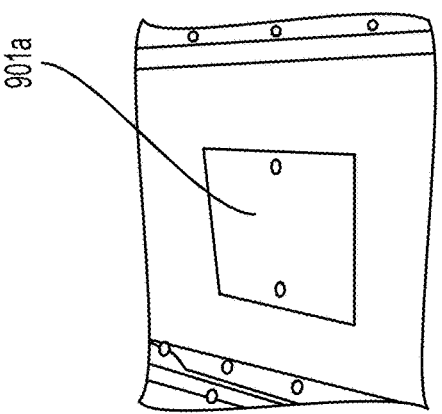
FIGS. 10A-10E are photographs of steps in a method of making an interconnect according to an embodiment.
Figure 10B:
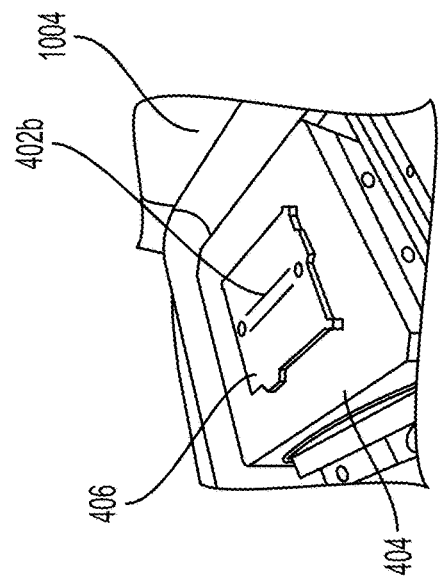
Figure 10C:
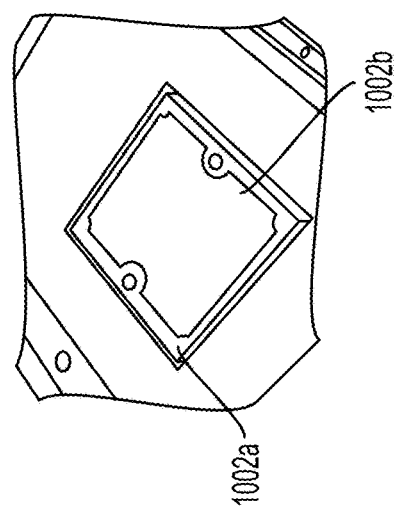
Figure 10D:
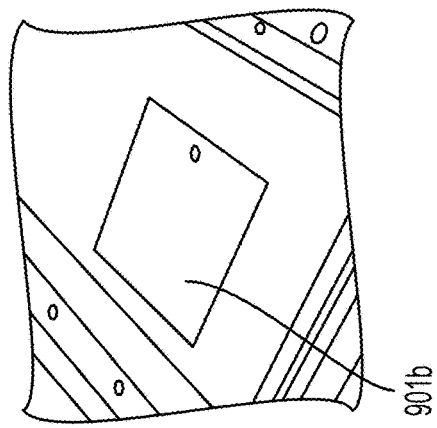
Figure 10E:
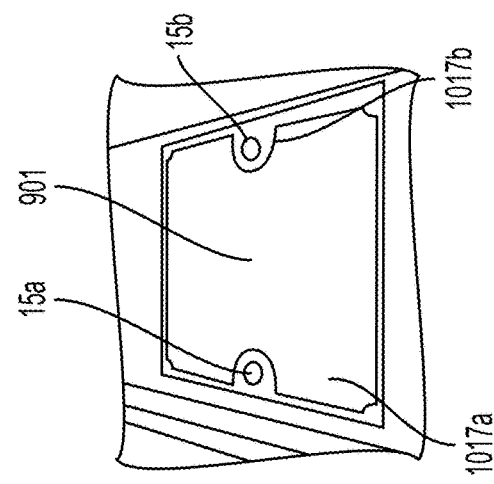

FIGS. 10A-10E illustrate one embodiment in which the inserts 1002a, 1002b may be used to achieve complex powder shaping contours. First, the lower tooling (e.g., lower punch 402b) may be moved to create an initial cavity 406 for powder fill, as illustrated in FIG. 10A. Next, the lower portion 901a of the metal powder may be provided from the fill shoe 1004 to fill the cavity 406, as shown in FIG. 10B. The lower punch 402b is moved down and one or more inserts 1002a, 1002b are then placed upon the lower portion 901a of the powder, as shown in FIG. 10C. In this embodiment, the inserts 1002a, 1002b have the inverse shapes of the plenums 17a, 17b shown in FIG. 1C. The inserts may have any other suitable shape depending on the interconnect shape. Then, additional powder (e.g., the upper portion 901b of the metal powder from the fill shoe 1004) is provided on the initial powder fill 901a and inserts, as shown in FIG. 10D. Finally, FIG. 10E illustrates a powder shape achieved after the inserts are vertically removed. Since the inserts 1002a, b have the inverse shapes of the plenums 17a, 17b, removal of the inserts results in recesses 1017a, 1017b in the powder that correspond to the plenums which will be formed in the interconnect after compaction. In an additional embodiment, the process shown in FIGS. 10A-10D may be repeated any number of times before removing the inserts to achieve more complex multiple level thickness in the powder shaping. This embodiment is compatible with standard powder fill shoe 1004 operations. Additionally, it allows complex powder shaping to be achieved in a single process step with the insert design.

In another embodiment, complex three dimensional powder shaping can be achieved by providing the metal powder in the die cavity of the powder press apparatus and selectively vacuuming the metal powder from one or more desired locations. The amount of removal volume can be achieved by vacuum process parameter control (e.g., pressure and/or distance of a vacuum nozzle from the powder). In an embodiment, a dedicated vacuum nozzle or manifold design is based on powder mixture characteristics (e.g., size, density, and/or viscosity). In an embodiment, the final powder shaping can be achieved by mounting the vacuum nozzle on an XYZ linear stage and programming the moving path, distance, and speed. The nozzle may thus move around the powder surface to create arbitrary powder shaping.

In an exemplary aspect of the present invention, the lower tooling (e.g., lower punch 402b) can be located in this apparatus to create a cavity 406 corresponding to the largest thickness of the powder 901 to be filled into the cavity 406. After filling the cavity with metal powder using the fill shoe described above, a motion control linear stage fixture mounted with a vacuum nozzle is operated with a preprogrammed moving path to create powder shape with multiple thickness steps and a complex contours. In a further exemplary embodiment, the vacuum nozzle can be connected to a vacuum hose. To improve to throughput of this process, a vacuum manifold may be utilized to apply multiple vacuums simultaneously at plural desired regions to form the powder shape in a single operation. Embodiments using a vacuum to remove metal powder have a non-limiting advantage of accomplishing complex three dimensional powder shaping in just a single powder fill operation. Additionally, the program controlled moving path of the powder removal vacuum provides the flexibility to achieve different powder shapes without changing any hardware. They further provide closed loop control on detailed powder shaping tuning based on compaction results.

Figure 11A:
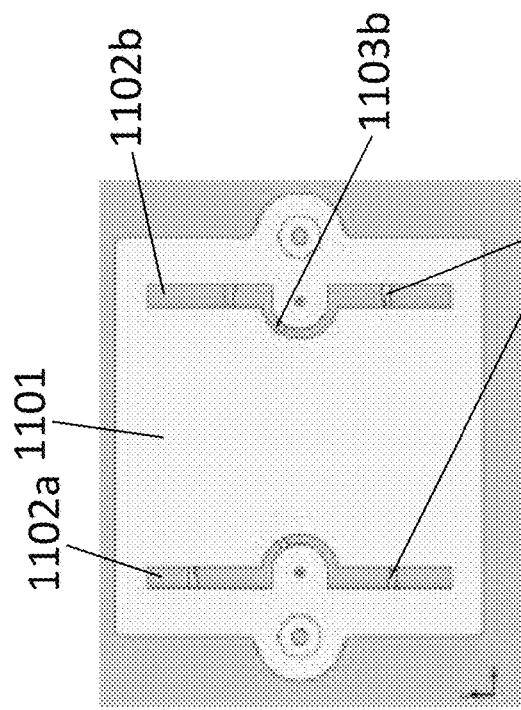
FIGS. 11A-11D are perspective views from varying angles of a mask with movable scrapers for pushing powder.
Figure 11B:
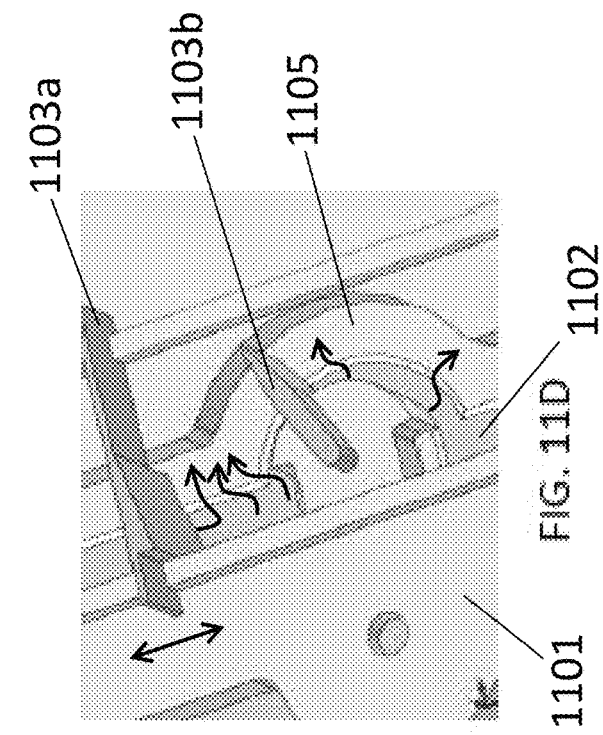
Figure 11C:
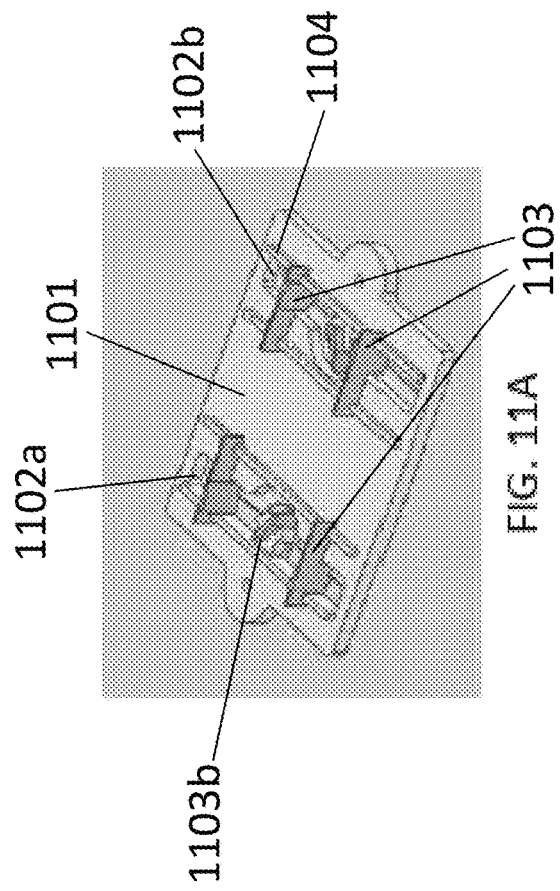
Figure 11D:
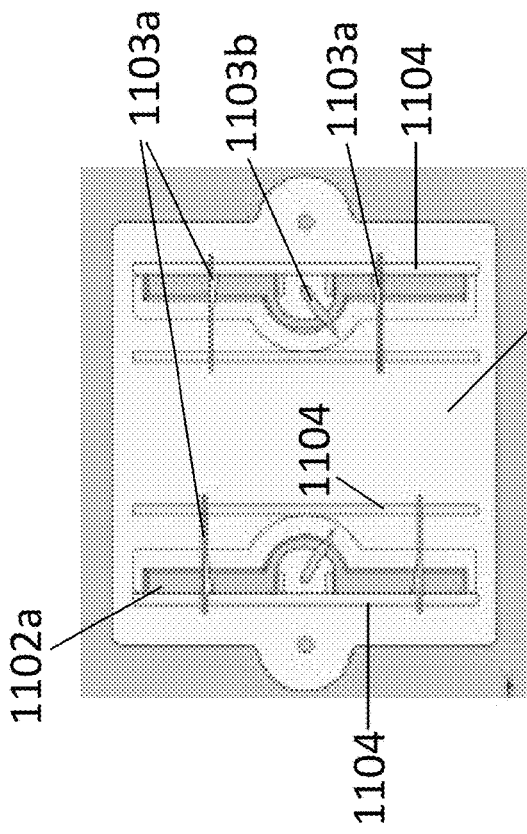

In another embodiment, complex three dimensional powder shaping can be achieved by providing the metal powder in the die cavity of a powder press apparatus, providing at least one mask and at least one scraper over the metal powder, and operating the at least one scraper to remove excess metal powder. FIGS. 11A-11C illustrate one non-limiting mask and scraper design. FIG. 11A shows a perspective view of a mask and scraper assembly overview. FIG. 11B illustrates a bottom view of the mask and scraper assembly and FIG. 11C illustrates atop view of the mask and scraper assembly of FIG. 11A. FIG. 11D is a close-up view of the scraper of FIG. 11C.

As illustrated in FIGS. 11A-11D, the mask and scraper assembly may be pressed into the powder located on the support. The excess powder then rises through openings 1102a, 1102b in the mask 1101. Scrapers 1103 may move on an axis or optionally rails 1104 to push powder away from openings 1102a, 1102b and onto ledge 1105 of the opening in the mask. The scrapers can be separate from the mask and can be operated manually or mechanically. Further, the scrapers can be any blade or moving surface which can move powder (e.g., the scraper can be a manual wiper blade).

In an exemplary embodiment, the fill shoe described above can fill the cavity with powder above the lower punch 402b. The mask 1101 can then be installed and the scraper(s) 1103 operated on the pre-defined moving path to shift and move excess powder into noncritical locations. The mask and scraper may then be removed, and a vacuum applied to remove the excess powder from the mask.

In one embodiment, the scraper may shift excess powder into a noncritical designated location 1105 outside the powder fill/tooling region of the mask surface, such as the ledge 1105 next to the openings 1102 in the mask 1101. A vacuum may then be employed to remove the excess powder from the ledge 1105. In an embodiment, the mask defines the moving path of the scrapers 1103a, 1103b, thereby generating the desired powder shape and also protecting the non-excess powder. The distance the scraper is submerged in the metal powder may be adjustable, thereby controlling an amount of metal powder removed.

Exemplary mask openings 1102 may be located in locations corresponding to plenums 17a, 17b in the interconnect 9. The scrapers 1103a, 1103b remove the excess powder in the plenum locations such that the plenum recesses described above are formed in the interconnect after the pressing step.

The mask and scraper method allows for complex three dimensional powder shaping in just a single powder fill operation. Further, it minimizes concerns of mixture uniformity and achieves a large pattern shaping area in a single operation.

In another embodiment, complex three dimensional powder shaping can be achieved by providing a programmable linear array of adjustable height scrapers attached to the powder fill shoe or another support and raising and lowering the programmable linear array of adjustable height scrapers as the powder fill shoe or another support is retracted, thereby removing excess metal powder. The adjustable height scrapers may be programmed to move up and down to correspond to the desired final powder shape as the shoe is retracted. In a preferred embodiment, the linear array is wide enough to extend the full extent of the powder area (e.g., the interconnect 9 width) being prepared for powder pressing.

FIGS. 12A-12C illustrate a programmable linear array of adjustable height scrapers 1203 attached to a powder delivery fill shoe 1004. FIG. 12A is a side view of a shoe 1004 with the scrapers 1203 attached to the forward tip. The powder is stored in the middle shoe section 1204 before moving forward across the die cavity. The vertical arrow shows the vertical motion of the individual scrapers and the horizontal arrow shows the retraction movement of the fill shoe 1004 over the powder 901. An optional feed tube 1206 is provided for additional powder as the powder is released through the lower section of the shoe 1004. Scrapers 1203 can be any surface or blade which can move powder. For example, the scrapers 1203 can be lowered in location of the plenums 17a, 17b on the interconnect 9 to leave recesses in these locations when the shoe retracts. The scrapers may be raised over other portions of the powder 901 which correspond to ridges or ribs in the interconnect 9.

FIG. 12B illustrates a front-side view of the fill shoe 1004 shown in FIG. 12A. In FIG. 12B, the individual scrapers 1203 are shown in full down position. FIG. 12C illustrates a front view of the same shoe 1004. However, unlike FIG. 12B, FIG. 12C illustrates the shoe 1004 in a different horizontal location over the powder 901 where seven total individual scrapers 1203a, b, c are displaced upwards (i.e., raised) by a controlled amount, to allow more powder to be left behind as the shoe retracts back over the powder 901. The remaining scrapers 1203d remain in full down position.

Utilizing adjustable height scrapers offers several advantages, including creating complex three dimensional powder shaping in just a single powder fill operation. Further, it minimizes concerns of mixture uniformity and achieves a large pattern shaping area in a single operation. Additionally, it provides for a large degree of flexibility to change the powder shape, since it is under programmed control of a controller. This method also permits quick feedback if the powder density is slightly different from what is normal or typical. In another embodiment, the scrapers 1203 are mounted on another support (e.g., a support plate) rather than on the shoe 1004.

While solid oxide fuel cell interconnects, end plates, and electrolytes were described above in various embodiments, embodiments can include any other fuel cell interconnects, such as molten carbonate or PEM fuel cell interconnects, or any other metal alloy or compacted metal powder or ceramic objects not associated with fuel cell systems.

Figure 13A:
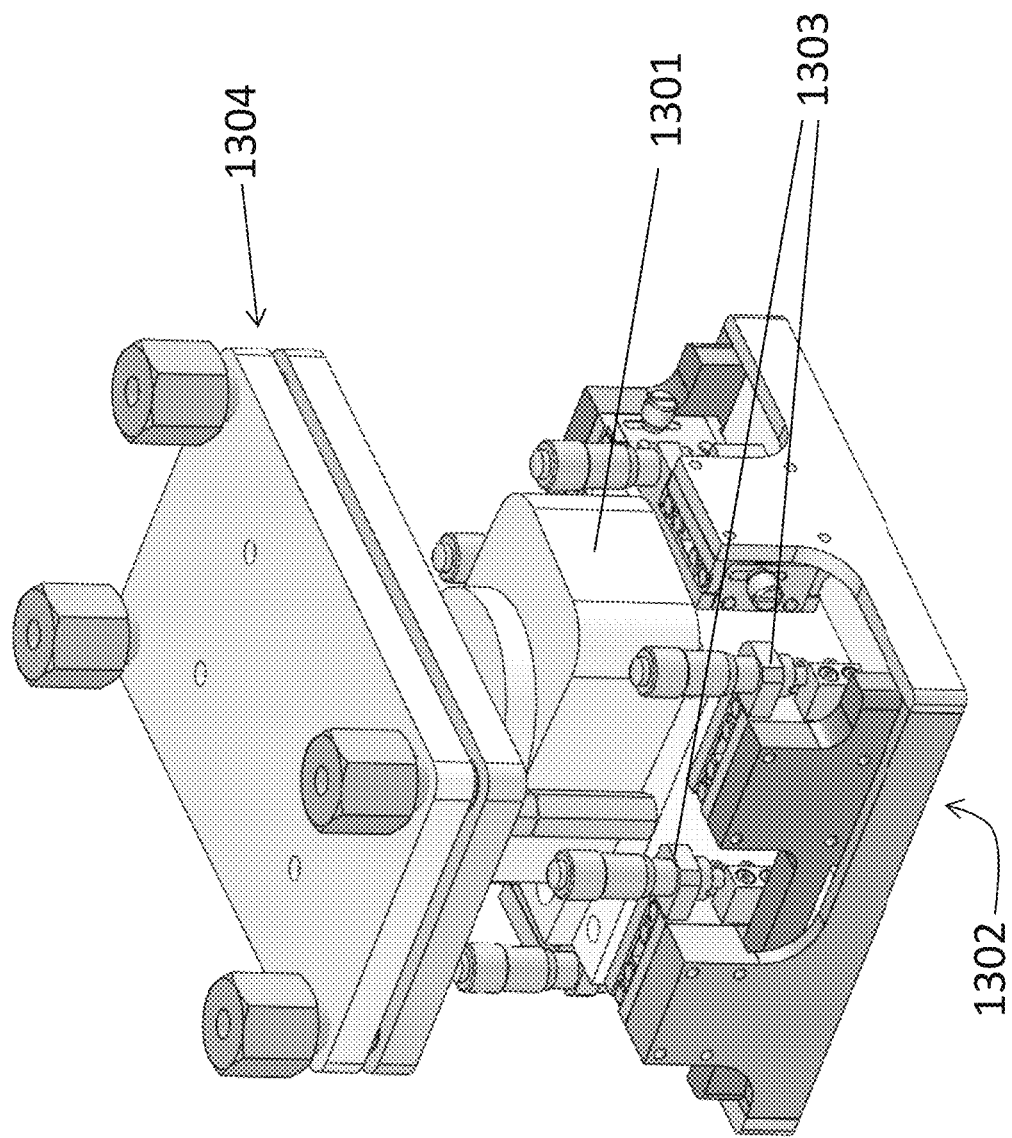
FIGS. 13A-13B are perspective views of a vibrator shaping tool assembly.

An embodiment also provides for a method of forming an interconnect with or without the use of a preform structure (i.e., the preform structure is optional). In an embodiment, powder may be provided into the die cavity 406 and may then be vibrated and compressed to form the preform structure 401 or the final interconnect 9. For example, the upper shaping punch 902 may also serve as a vibration assembly for vibrating the powder, as illustrated in FIG. 13A. The punch 902 contains a vibrator 1301 located above the bottom punch surface 1302 and below the top portion 1304.

Figure 13B:
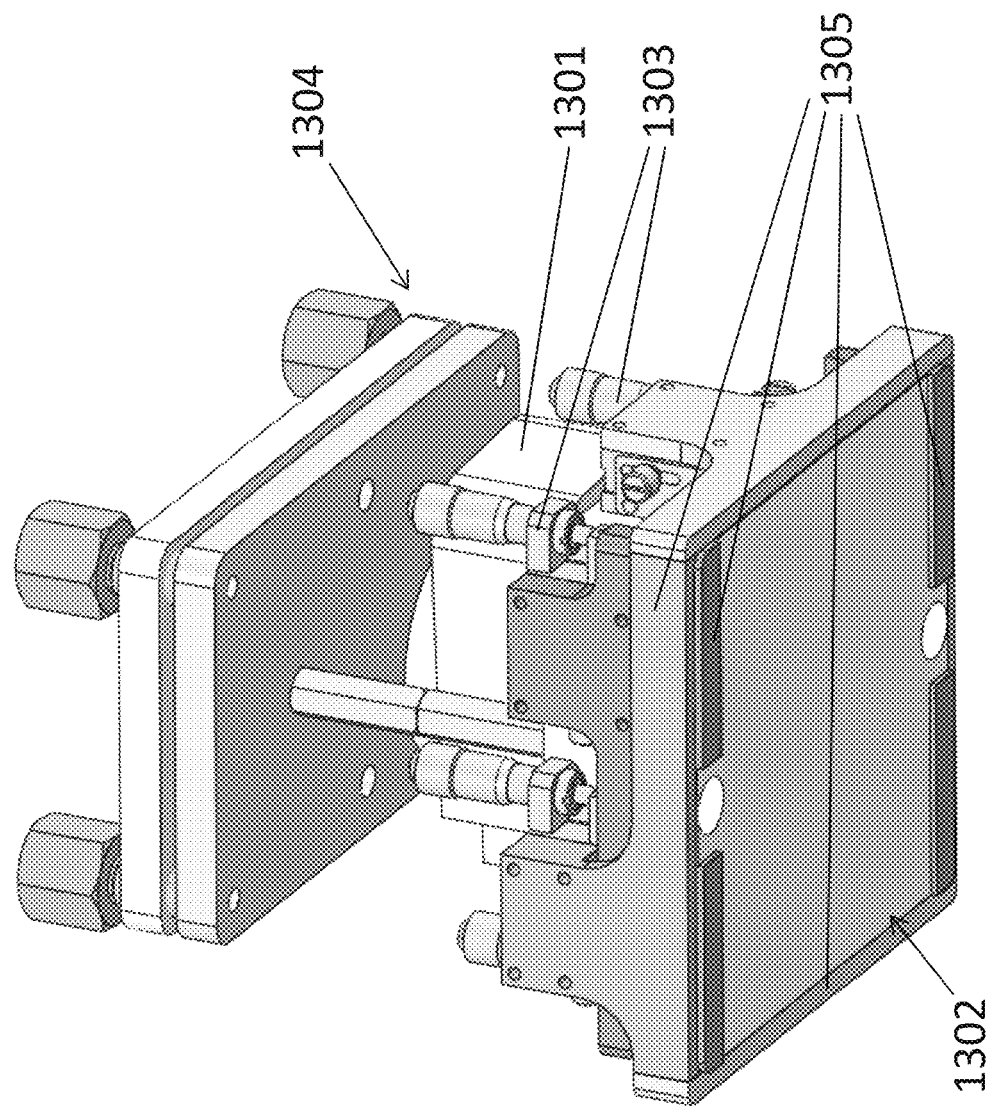

It may also be desirable to change the relative vertical position of the various regions (e.g., protrusions 904a and/or edge surfaces) on the bottom of the upper shaping punch 902. This may be accomplished with adjusting guides 1303. FIG. 13B shows that adjusting guides 1303 may be raised or lowered to adjust the adjustable shaping surfaces 1305 (i.e., portions which protrude into and/or out of bottom punch surface 1302) which correspond to the protrusions 904a in FIG. 9E and/or the edge surfaces of the lower surface of the punch 902. The adjustable shaping surfaces 1305 may form one or more plenums on the interconnect 9, such as inlet plenum 17a and outlet plenum 17b, shown in FIG. 1C, after compression of the powder. Specifically, the adjusting guides 1303 may be controlled to push the adjustable shaping surfaces 1305 up or down through the bottom surface 1302 of punch 902. Having adjustable, as opposed to fixed, surfaces may be preferable because it may be desirable to adjust the shape of the bottom punch surface 1302 based on the powder density in order to maintain a substantially constant compaction ratio (e.g., the compaction ratio illustrated in FIG. 5B). While the upper punch is described above, the vibrator and/or adjustable surfaces may also be provided in the lower punch in addition to or in place of the upper punch.

It may also be preferable to determine the optimal time to stop vibrating the powder (i.e., "end point"). If left vibrating longer than necessary, powder may be vibrated into undesirable locations. For example, powder may crawl up the gap between the punch 902 and the die 404. Additionally, excessive vibration times may lead to detrimental segregation of the powder particles.

An embodiment provides determining the end point based upon measuring the change in the vibration of the powder as the powder moves into position. Any suitable method of measuring vibration may be used, for example by optically or acoustically detecting amplitude and/or frequency of the powder vibration in the cavity as the powder moves into position.

Acoustically, the sound of the powder vibration may be detected using an acoustic detector and a processor which can compare the output value of the acoustic detector to values in a look up table. Optically, a laser may be used to detect powder vibration frequency and/or amplitude. The laser beam may be pointed at the powder through an opening with a clear cover in die 404. The vibrating powder reflects the laser light to a photodetector through the same or a different opening. A processor may be used to compare the output value of the photodetector to values in a look up table.

The powder vibration changes in amplitude and/or frequency as the powder stops flowing laterally into position in the cavity. As the end point of the flow is approached, the powder vibration amplitude decreases and the frequency increases. When the powder stops flowing laterally into position, the bottom of the vibrator shaping tool assembly is in contact with substantially uniformly dense powder and there is no further substantial change in the powder vibration frequency or amplitude. The vibration may be stopped when the end point of the powder flow has been reached when the frequency and amplitude no longer substantially change (e.g., the change is less than 5%) over time (e.g., between 10 sec and 10 minutes). Vibration may be stopped when the vibration frequency reaches 5-5000 Hz (e.g., 35-45 Hz) and remains substantially constant (e.g., varies less than 5% over time). Alternatively, the vibration may be stopped when the vibration amplitude reaches the average size of an individual powder particle and remains substantially constant (e.g., varies less than 5% over time). This may occur in the when the amplitude is 0.02-2 mm (e.g., 0.1-0.2 mm).

Embodiments which determine the end point may be used in conjunction with other embodiments. For example, an end point may be detected for vibrating the preform structure 401. Vibrating the preform structure may thus be stopped when the end point is reached.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of fabricating an interconnect for a fuel cell system, comprising
   providing powder to a die cavity of a press apparatus;
   vibrating the powder into a desired shape in the die cavity;
   detecting at least one of a frequency or an amplitude of the powder during the vibrating of the powder;
   stopping the vibrating of the powder when the detected frequency or the amplitude substantially stops changing over time; and
   compressing the powder in the press apparatus to form the interconnect or a preform structure of the interconnect.

2. The method of claim 1, wherein:
   vibrating the powder into a desired shape comprises vibrating the powder to fill the die cavity; and
   compressing the powder comprises compressing the powder to form the interconnect.

3. The method of claim 2, further comprising adjusting a height of protrusions on at least one punch in the press apparatus as a function of powder density prior to compressing the powder using the punch.

4. The method of claim 1, wherein the frequency or the amplitude is detected using a laser.

5. The method of claim 1, wherein the frequency or the amplitude is detected acoustically.

6. The method of claim 1, further comprising stopping the vibration when the amplitude is substantially equal to an average particle size of the powder.

7. The method of claim 1, wherein the vibration is stopped when the frequency is between 5 Hz and 5000 Hz.

8. The method of claim 1, wherein vibration is stopped when the amplitude is between 0.01 mm and 2 mm.

* * * * *